United States Patent
Schreurs et al.

(10) Patent No.: US 10,679,245 B1
(45) Date of Patent: Jun. 9, 2020

(54) CUSTOMIZED MARKETING WITH MICRO AND NANO GRANULARITY

(71) Applicant: Strategic America, Inc., West Des Moines, IA (US)

(72) Inventors: John C. Schreurs, Des Moines, IA (US); Michael R. Schreurs, Johnston, IA (US); Kevin A. Strouse, Waukee, IA (US)

(73) Assignee: STRATEGIC AMERICA, West Des Moines, IA (US)

( * ) Notice: Subject to any disclaimer, the term of this patent is extended or adjusted under 35 U.S.C. 154(b) by 712 days.

(21) Appl. No.: 15/181,312

(22) Filed: Jun. 13, 2016

Related U.S. Application Data

(60) Provisional application No. 62/230,695, filed on Jun. 12, 2015.

(51) Int. Cl.
    *G06Q 30/02* (2012.01)
    *H04L 9/32* (2006.01)

(52) U.S. Cl.
    CPC ..... *G06Q 30/0249* (2013.01); *G06Q 30/0242* (2013.01); *G06Q 30/0251* (2013.01);
    (Continued)

(58) Field of Classification Search
    CPC ................ G06Q 30/0274; G06Q 30/0249
    (Continued)

(56) References Cited

U.S. PATENT DOCUMENTS

| | | | |
|---|---|---|---|
| 2002/0007308 A1* | 1/2002 | Anderson | G06Q 30/02 705/14.48 |
| 2004/0010598 A1* | 1/2004 | Bales | G06F 9/451 709/228 |

(Continued)

FOREIGN PATENT DOCUMENTS

| | | | | |
|---|---|---|---|---|
| KR | 20160090053 A | * | 7/2016 | G06F 16/285 |
| WO | 2005114525 A2 | | 12/2005 | |

OTHER PUBLICATIONS

"Check digit", Wikipedia, archived on May 14, 2015, https://en.wikipedia.org/w/index.php?title=_digit&oldid=662280905 (Year: 2015).*

(Continued)

*Primary Examiner* — Michael Bekerman
*Assistant Examiner* — Scott Snider
(74) *Attorney, Agent, or Firm* — Nyemaster Goode, P.C.

(57) ABSTRACT

A method to implement and simultaneously managing at least marketing content, marketing budget, and marketing delivery consistent with a brand marketing strategy of a brand owner across multiple sub-entities that includes at least the steps of: providing a remote computer server system accessible via a network and containing a database of marketing fields; setting up a marketing management portal for the macro entity brand owner where the setup input includes at least a unique URL for the marketing management portal and one or more fields that are to be selected by the setup user and used in connection with the marketing management portal that thereby define the set of marketing (Continued)

portal fields; providing a plurality of preapproved advertising campaign options to various users; selecting a delivery method for the advertising campaign using the marketing management portal; and executing the advertising campaign without further input from the user with credentials.

20 Claims, 32 Drawing Sheets

(52) U.S. Cl.
CPC ....... *G06Q 30/0274* (2013.01); *H04L 9/3236* (2013.01); *G06Q 2220/00* (2013.01); *H04L 2209/56* (2013.01)

(58) Field of Classification Search
USPC .............................................. 705/14.48, 14.7
See application file for complete search history.

(56) References Cited

U.S. PATENT DOCUMENTS

| | | | |
|---|---|---|---|
| 2006/0278698 A1* | 12/2006 | Lovett | G06Q 20/24 235/380 |
| 2007/0192192 A1 | 8/2007 | Haberman | |
| 2007/0233566 A1* | 10/2007 | Zlotin | G06Q 30/02 705/14.41 |
| 2008/0147553 A1 | 6/2008 | Orner et al. | |
| 2009/0192869 A1* | 7/2009 | Irvine | G06Q 10/00 705/7.29 |
| 2010/0076897 A1* | 3/2010 | Malani | G06Q 30/02 705/80 |
| 2010/0100418 A1* | 4/2010 | Richter | G06Q 30/02 705/7.32 |
| 2011/0191417 A1* | 8/2011 | Rathod | G06F 16/58 709/204 |
| 2012/0130536 A1* | 5/2012 | Canter | G06Q 20/18 700/237 |
| 2014/0122237 A1* | 5/2014 | Thierer | G06Q 30/02 705/14.56 |
| 2014/0365284 A1* | 12/2014 | Upadhya | G06Q 30/0241 705/14.4 |
| 2018/0365707 A1* | 12/2018 | Jha | G06Q 30/0245 |

OTHER PUBLICATIONS

Linder, R., Geier, J. and Kölliker, M. (2004) 'Artificial neural networks, classification trees and regression: Which method for which customer base?', Journal of Database Marketing & Customer Strategy Management, 11(4), pp. 344-356 (Year: 2004).*

Soltys, M., Jaroszewicz, S. and Rzepakowski, P. (2015) 'Ensemble methods for uplift modeling', Data Mining & Knowledge Discovery, 29(6), pp. 1531-1559. doi: 10.1007/s10618-014-0383-9. (Year: 2015).*

Adams, R. (2004) 'Intelligent advertising', AI & Society, 18(1), pp. 68-81. doi: 10.1007/s00146-003-0259-9. (Year: 2004).*

United States Patent and Trademark Office, Non-Final Office Action mailed in connection with U.S. Appl. No. 15/358,599, dated Dec. 30, 2019, 18 pages.

* cited by examiner

FIG. 3

| | Media | Type | Sub Type | Macro | Micro 1 | Micro 2 | Micro 3 | Micro 4 | Nano 1 | Nano 2 | Nano 3 | Nano 4 |
|---|---|---|---|---|---|---|---|---|---|---|---|---|
| 207 → | Internet/ Mobile | E-Mail | | ✓ | ✓ | ✓ | ✓ | ✓ | ✓ | ✓ | ✓ | ✓ |
| | | Text | | ✓ | ✓ | ✓ | ✓ | ✓ | | | | |
| | | YouTube | | ✓ | | | | | | | | |
| | | Facebook | | ✓ | | | | | | | | |
| | | Google | | ✓ | ✓ | ✓ | ✓ | ✓ | ✓ | ✓ | ✓ | ✓ |
| | | Yahoo | | ✓ | ✓ | ✓ | ✓ | ✓ | ✓ | ✓ | ✓ | ✓ |
| | | LinkedIn | | ✓ | | | | | ✓ | ✓ | ✓ | ✓ |
| | | ... | | | | | | | | | | |
| | | Other | | | | | | | | | | |
| 208 → | Print | Direct Mail | | | ✓ | ✓ | ✓ | ✓ | ✓ | ✓ | ✓ | ✓ |
| | | Weekly News Paper | Shopper | | | | | | ✓ | ✓ | ✓ | ✓ |
| | | | Neighborhood | | | | | | ✓ | ✓ | ✓ | ✓ |
| | | | Other | | ✓ | ✓ | ✓ | ✓ | ✓ | ✓ | ✓ | ✓ |
| | | Daily News Paper | USA Today | ✓ | | | | | | | | |
| | | | WSJ | ✓ | | | | | | | | |
| | | | NY Times | ✓ | | | | | | | | |
| | | | Wash. Post | | | | | | | | | |
| | | | ... | | | | | | | | | |
| | | | Other | | | | | | | | | |
| | | Magazine | Vogue | | | | | | | | | |
| | | | Arch. Digest | | | | | | | | | |
| | | | Pop. Science | | | | | | | | | |
| | | | Cooks | ✓ | | | | | | | | |
| | | | ... | | | | | | | | | |
| | | | Other | | | | | | | | | |
| 209 → | Television | ABC | | ✓ | ✓ | ✓ | ✓ | ✓ | | | | |
| | | NBC | | | | | | | | | | |
| | | Fox | | | | | | | | | | |
| | | CBS | | | | | | | | | | |
| | | Cable | ......... | | ✓ | ✓ | ✓ | ✓ | | | | |
| | | ... | | | | | | | | | | |
| | | Other | | | | | | | | | | |
| 210 → | Radio | WHO | | | ✓ | ✓ | ✓ | ✓ | ✓ | ✓ | ✓ | ✓ |
| | | KIOS | | | | | | | ✓ | ✓ | ✓ | ✓ |
| | | ... | | | | | | | | | | |
| 211 → | | Other | | | | | | | | | | |
| 212 → | Content Center | ... | | | | | | | | | | |
| 213 → | Public Relations Events | ... | | | | | | | ✓ | ✓ | ✓ | ✓ |
| | Other | ... | | | | | | | | | | |

325

| Metric Type ←333 | Sub-Type | Zip Code | County | State | Nation | ... |
|---|---|---|---|---|---|---|
| Nielson Ratings | | | | | | |
| Sales Data | | | | | | |
| Web Clicks | Partial Views | | | | | |
| | Completed | | | | | |
| Coupon Redemption | | | | | | |
| Opportunities | | | | | | |
| ... | | | | | | |

| January 11, 2016 Des Moines register 10% off coupon EA Dairy one Gallon Milk | | | |
|---|---|---|---|
| 352 → $2000 Buy  353 | | | |
| | 11-inch by 9-inch FSI, 4 color | | |
| 3000 Circulation zip code 50309 | Index 8 ←358 | | $300 ←362 |
| 5000 Circulation zip code 50311 | Index 8 ←359 | | $500 ←363 |
| 3000 Circulation zip code 50312 | Index 8 ←360 | | $1,000 ←364 |
| 3000 Circulation zip code 50314 | Index 6 ←361 | | $200 ←365 |
| | | Total: | $2,000 |

LOGO HERE

SEARCH DEALERS... 🔍 +

> DEALER INFORMATION
  ∨ BUSINESS INFO
  ∨ CONTACT INFO
  ∨ ALTERNATE CONTACT INFORMATION
  ∨ CONTACTS
  ∨ TM INFO
  ∨ BRANDS
  ∨ OTHER INFO

TAG INFORMATION
  ∨ TAG INFO
  ∨ DEALER LOGO
  ∨ OFFER INFO

CO-OP ACCOUNT

ORDERS

ORDER FULFILLMENTS

UPLOAD PLANS / CREATIVE

USERS

NOTES

MARKET TABLE DATA

---

| DEALER NUMBER | DEALER NAME | DISTRIBUTER |
|---|---|---|
| Gptest | Test Dealership | DISTRIBUTION NAME |

🗑 DELETE | 💾 SAVE

BUSINESS ADDRESS INFORMATION

*DEALER NAME: TEST DEALERSHIP
ADDRESS 1: 1234 SOUTH MAIN STREET
ADDRESS 2:
CITY: DES MOINES
STATE: IOWA ▸
ZIP CODE: 50266
WEBSITE:
IS ACTIVE: ON
*DEALER GROUP: TERRITORY MANAGER: GPTMtest ▸

Select Workflow

701

To place a Direct Mail order for the national promotion OR for your distributor on-demand program, please click on the "Direct Mail Advertising" button.

[DIRECT MAIL ADVERTISING]

To place a Cable order OR request media research for Newspaper and/or Radio, please click on the "Awareness Advertising" button.

[AWARENESS ADVERTISING]

*FIG. 12*

| 2016 ADVERTISING | ONE DAY SALES EVENT |
|---|---|
| HOMEOWNER POSTCARD (STANDARD POSTAGE) | LAWNCARE CO/EQUIPMENT CO POSTCARD |

BELOW, SELECT FROM EXISTING CUSTOMERS AND/OR PROSPECTS. MINIMUM ORDER QUANTITY IS 1000.
NOTE: IT IS HIGHLY RECOMMENDED YOU SEND TO YOUR EXISTING CUSTOMERS.

YOU CAN CLICK ON ENTIRE COLUMNS TO SELECT ALL COUNTS AVAILABLE, OR YOU CAN CHOOSE INDIVIDUALLY PER ZIP. EACH COLUMN IS SORTABLE TO HELP MAKE SELECTIONS. YOU CAN ALSO CLICK ON THE "+" NEXT TO EACH ZIP FOR MORE DEMOGRAPHIC INFORMATION TO HELP TARGET YOUR ADVERTISING.

SHOW [10 ▼] ENTRIES         SEARCH: [    ]

| DETAILS | ZIP CODE | CITY | DISTANCE | ☐ HO EXISTING | ☐ <1 ACRE | ☐ 1-5 ACRES | ☐ 5+ ACRES | ☐ UN |
|---|---|---|---|---|---|---|---|---|
| ⊕ | 43005 | BLADENSBURG | 13.58 | 0 ☐ | 0 ☐ | 0 ☐ | 3 ☐ | |
| ⊕ | 43011 | CENTERSBURG | 10.07 | 14 ☐ | 302 ☐ | 670 ☐ | 87 ☐ | |
| ⊕ | 43013 | CROTON | 13.82 | 0 ☐ | 26 ☐ | 100 ☐ | 12 ☐ | |
| ⊕ | 43014 | DANVILLE | 13.91 | 7 ☐ | 45 ☐ | 167 ☐ | 47 ☐ | |
| ⊕ | 43019 | FREDERICKTOWN | 7.96 | 25 ☐ | 594 ☐ | 545 ☐ | 111 ☐ | |
| ⊕ | 43022 | GAMBIER | 8.65 | 7 ☐ | 767 ☐ | 167 ☐ | 48 ☐ | |
| ⊕ | 43026 | HILLIARD | 42.94 | 0 ☐ | 9207 ☐ | 302 ☐ | 38 ☐ | |
| ⊕ | 43028 | HOWARD | 12.01 | 43 ☐ | 1425 ☐ | 167 ☐ | 37 ☐ | |
| ⊕ | 43035 | LEWIS CENTER | 29.07 | 1 ☐ | 5063 ☐ | 310 ☐ | 14 ☐ | |
| ⊕ | 43037 | MARTINSBURG | 12.21 | 1 ☐ | 0 ☐ | 7 ☐ | 2 ☐ | |
| | SELECTED: | | | 0 | 0 | 0 | 0 | |

SHOWING 1 TO 10 OF 24 ENTRIES          [PREVIOUS | 1 | 2 | 3 | NEXT]

FIG. 13

COMPANY LOGO   HELLO, TESTCORP

| REQUEST AD PLAN & CREATIVE | BILLING<br>AMC | BRANCH NAME<br>AMC | REGION<br>ROCKY MOUNTAIN |
|---|---|---|---|

WELCOME

SELECT BRANCH

CONTACT INFORMATION
> BRANCH CONTACTS

> *REQUEST AD PLAN*
  > AD PLAN TYPE & MEDIA
  > CREATIVE TEMPLATE
  > CREATIVE TAG
  > GEO-TARGETING AND TIMING
  > EVENT TITLE & TOPICS
  > BILLING INFORMATION

REVIEW SELECTIONS

SIGN & CONFIRM

THANK YOU

WHAT ARE THE SPECIFICS OF THE AD PLAN YOU'RE REQUESTING?

YOU WILL LET US KNOW FOUR KEY THINGS DURING THIS STEP OF THE PROCESS:
1. SELECT THE TYPE OF AD PLAN YOU'RE REQUESTING
2. TITLE YOUR CAMPAIGN
3. ENTER THE BUDGET FOR THE CAMPAIGN
4. SELECT THE MEDIA TYPES YOU'RE MOST INTERESTED IN. IF THERE ARE SPECIFIC REQUESTS FOR ANY MEDIA TYPES (I.E. COLOR ADS FOR NEWSPAPER, SPECIFIC STATIONS OR RUN TIMES FOR RADIO, ETC.) PLEASE INCLUDE THOSE DETAILS IN THE COMMENT BOXES

COMPANY SEMINAR

*CAMPAIGN NAME [NONWEILER FALL]   *BUDGET [$1,500.00]

[☑ SELECT] AGENCY RECOMMENDATION  [COMMENT]
[☑ SELECT] DIRECT MAIL  [COMMENT]
[☑ SELECT] FACEBOOK  [COMMENT]
[☑ SELECT] NEWSPAPER/PRINT  [COMMENT]
[☑ SELECT] POSTERS  [COMMENT]

| COMPANY LOGO | HELLO, TESTCORP | | | | |
|---|---|---|---|---|---|
| COMPANY ADVERTISING PROGRAM | DEALER # TESTCOMPANY2 | DEALER NAME PRODUCTS INC | | SLAES MANAGER JOHN DOE | |

WHICH ADVERTISING SEGMENT & PACKAGE DO YOU WANT?

CHOOSE ONE ADVERTISING PACKAGE FOR EACH SEGMENT IN WHICH YOU WISH TO PARTICIPATE. PLEASE CONTACT ACME CO AT 866-555-5555 IF YOU HAVE QUESTIONS OR WANT TO HELP PUTTING TOGETHER A PLAN.

SMALL BUSINESS

| | BRONZE | SILVER | GOLD |
|---|---|---|---|
| DIRECT MAIL | 1,000 PIECES | 1,000 PIECES | 1,000 PIECES |
| EMAIL | 1,000 EMAILS | 1,000 EMAILS | 1,000 EMAILS |
| TRADE PUBLICATION | | 3 ADS | 3 ADS |
| PAY PER CLICK | | | 250 CLICKS |
| COST | $1,000.00 | $2,500.00 | $5,000.00 |
| | SELECT | SELECT | SELECT |

INDUSTRIAL BUSINESS

| | BRONZE | SILVER | GOLD |
|---|---|---|---|
| DIRECT MAIL | 250 PIECES | 250 PIECES | 500 PIECES |
| EMAIL | 250 EMAILS | 250 EMAILS | 500 EMAILS |
| TRADE PUBLICATION | | 3 ADS | 6 ADS |
| COST | $1,000.00 | $2,500.00 | $5,000.00 |
| | SELECT | SELECT | SELECT |

Sidebar:
- INTRODUCTION
- SELECT DEALERS
- DEALER INFORMATION
  - BUSINESS INFO
  - CONTACT INFO
- TAG INFORMATION
  - TAG INFO
  - DEALER LOGO
- *ADVERTISING PACKAGES*
  - ADVERTISING PACKAGE
  - PROMOTION
  - TARGETING AND TIMING
- ORDER SUMMARY
- SIGN & CONFIRM
- THANK YOU

CUSTOMIZE YOUR CREATIVE
BELOW IS YOUR DEALER INFORMATION AS ENTERED IN STEP2. YOU CAN EDIT HERE IF NEEDED, OR CLICK NEXT TO CONTINUE.

| POSTCARD (Sp16) FEATURING BRANDNAMES 1 DAY SALE-FRONT | | | |
|---|---|---|---|
| (FRONT) TAGLINE 1 | STORE NAME | STORE NAME | *(REQUIRED) |
| TAGLINE2 | ADDRESS 1 | *(REQUIRED) | |
| TAGLINE3 | ADDRESS 2 | | |
| TAGLINE4 | PHONE # | | |
| EVENT DAY | SATURDAY | *(REQUIRED) | |
| DATE | XXX | *(REQUIRED) | |
| YEAR | XXXX | *(REQUIRED) | |
| EVENT TIME | XX:XX | *(REQUIRED) | |
| (BACK) TAGLINE 1 | STORE NAME | STORE NAME | |
| TAGLINE2 | ADDRESS 1 | | *(REQUIRED) |
| TAGLINE3 | ADDRESS 2 | *(REQUIRED) | |
| TAGLINE4 | PHONE # | | |
| DEALER LOGO | | | |

ONCE FINAL, PLEASE DOWNLOAD AND SAVE THE PROOF FOR YOUR RECORDS.

NOTE: FOR APPLICABLE CREATIVE PIECES, UPLOADED DEALER LOGOS MAY APPEAR GRAINY ON THE CREATIVE PROOF, DUE TO THE PROOF BEING A LOW-RESOLUTION FILE FOR VIEWING PURPOSES. YOUR FINAL, PRINTED PIECE WILL SHOW LOGOS IN THE SAME LEVEL OF QUALITY AS THEY WERE PROVIDED TO US

☐ I UNDERSTAND THAT MY CREATIVE PROOF WILL BE PRINTED AS SHOWN. I HAVE REVIEWED AND APPROVE OF THE CREATIVE PROOF AS SHOWN.

COMPANY1/COMPANY2 DO NOT ACCEPT RESPONSIBILITY FOR ANY DEALER SUPPLIED INFORMATION. I.E. MISSPELLINGS, ETC.

COMPANY1/COMPANY2 WILL NOT PROVIDE ANY REFUNDS OR MAKEGOOD ORDERS.

SUBMIT >>

FIG. 22

DEALER ADMINISTRATION

WELCOME TO THE DEALER ADMINISTRATION SECTION OF THE ORDSER SITE
IN THIS SECTION, YOU WILL HAVE ACCESS TO THE FOLLOWING
- ADD NEW DEALERS TO THE PROGRAM
- VIEW/EDIT EXISTING DEALER ACCOUNTS, INCLUDING DEALER BUDGETS
- VIEW/EDIT DIRECT MAIL ZIP CODE TARGETING DATA PER DEALER. THIS WILL ALLOW YOU TO EXPAND A DEALER ZIP RADIUS IF NEEDED
- ACCESS TO DEALER MEDIA SUMMARIES & CREATIVE PROOFS FROM PREVIOUS SEASONS AND VIEW ANY 2016 ORDERS PLACED TO DATE

BELOW, SELECT YOUR DEALER TO GET STARTED OR CLICK "ADD NEW DEALER" TO SET UP A NEW DEALER IN THE SYSTEM. CALL SA AT (8XX) XXX-XXXX FOR ANY QUESTIONS

DEALER STATUS [ALL ▼]           [+ ADD NEW DEALER]

SHOW [10 ▼] ENTRIES                                      SEARCH [        ]

| NAME | ▲ DEALER CODE | DEALER STATUS | |
|---|---|---|---|
| asfd | asfdtest | ACTIVE | [VIEW ACCOUNT] |
| XYZ'S OUTDOOR POWER EQUIPMENT TEST | CR12345TEST | ACTIVE | [VIEW ACCOUNT] |
| LETEST2 | LETEST2 | ACTIVE | [VIEW ACCOUNT] |

SHOWING 1 TO 3 OF 3 ENTRIES                             [PREVIOUS | 1 | NEXT]

---

LOGO HERE

| | DEALER # | DEALER NAME | DISTRIBUTION |
|---|---|---|---|
| ←SELECT DIFFERENT DEALER | LETEST2 | LETEST2 | NAME |

DEALER ADMINISTRATION
DEALER INFORMATION
  >BUSINESS INFO
  >CONTACT INFO
  >BRANDS
  >OTHER INFO
TAG INFORMATION
  >TAG INFO
  >DEALER LOGO
CO-OP ACCOUNT
  >*ORDERS*
  ORDER FULFILLMENTS
  ZIP DATA

2016 ORDERS
BELOW YOU CAN VIEW YOUR 2016 ORDERS
OR
IF YOU WANT TO REFERENCE MEDIA SUMMARIES FROM PRIOR SEASONS CLICK HERE
THERE ARE NO ORDERS TO DISPLAY

FIG. 23

ZIP DATA DASHBOARD

SELECT RADIUS [0-15 MILES ▼]
ZIP STATUS [ACTIVE ▼]

SHOW [10 ▼] ENTRIES                                                      SEARCH: [    ]

| DETAILS | | ▲ ZIP CODE | CITY | DISTANCE | AVG. HOME VALUE | AVG. HOME INCOME | POPULATION |
|---|---|---|---|---|---|---|---|
| ⊕ | ☑SELECT | 50316 | DES MOINES | 10.25 | $91,500.00 | $37,424.00 | $16,440.00 |
| ⊕ | ☑SELECT | 50063 | DALLAS CENTER | 14.53 | $163,700.00 | $72,283.00 | $2,604.00 |
| ⊕ | ☑SELECT | 50211 | NORWALK | 10.69 | $164,300.00 | $77,815.00 | $11,192.00 |
| ⊕ | ☑SELECT | 50321 | DES MOINES | 5.88 | $188,200.00 | $51,653.00 | $7,846.00 |
| ⊕ | ☑SELECT | 50033 | BEVINGTON | 14.69 | $80,800.00 | $76,042.00 | $44.00 |
| ⊕ | ☑SELECT | 50317 | DES MOINES | 12.58 | $108,800.00 | $44,744.00 | $36,207.00 |
| ⊕ | ☑SELECT | 50327 | PLEASANT HILL | 14.50 | $182,800.00 | $76,871.00 | 10,467.00 |
| ⊕ | ☑SELECT | 50301 | DES MOINES | 9.57 | $0.00 | $0.00 | .00 |
| ⊕ | ☑SELECT | 50314 | DES MOINES | 8.59 | $89,900.00 | $30,473.00 | 12,465.00 |
| ⊕ | ☑SELECT | 50265 | WEST DES MOINES | 4.00 | $179,600.00 | $69,272.00 | 31,653.00 |

FIG. 24

LOGO HERE

LAWN COMPANY

SEARCH DEALERS 🔍 +

BRANCH INFORMATION
> BRANCH INFO
> CONTACT INFO
> CONTACTS

> *VIEW REQUESTS*

DIGITAL ASSETS

USERS

NOTES

◇▾ ? 🔧 👤▾

| BILLING CODE | BRANCH NAME | REGION |
|---|---|---|
| 0000.00000.000000 | FLORIDA | SOUTHEAST |

VIEW REQUESTS    [NEW SIGNUP] [NEW ORDER]

ORDER #: 14157 - #14157-HK-7/30/16 THE VILLAGES, FL SEMINAR W/DR. SMITH    🔍 DELETE

| TASK | DUE DATE | STATUS |
|---|---|---|
| CREATIVE PROOF | | WITH AGENCY |
| MEDIA PLAN | | WITH AGENCY |
| SEMINAR AGREEMENT | 6/21/2016 11:59:59 PM | INCOMPLETE |

ORDER #: 14156 - #14156-HK-7/13/16 WINTER PARK, FL SEMINAR W/DR. JONES    🔍 DELETE

| TASK | DUE DATE | STATUS |
|---|---|---|
| CREATIVE PROOF | | WITH AGENCY |
| MEDIA PLAN | | WITH AGENCY |

LOGO HERE

*LAWN COMPANY*

SEARCH DEALERS 🔍 +

BRANCH INFORMATION
 >BRANCH INFO
 >CONTACT INFO
 >CONTACTS

VIEW REQUESTS

DIGITAL ASSETS

>USERS

NOTES

904

BILLING CODE
0000.00000.000000

BRANCH NAME
FLORIDA

REGION
SOUTHEAST

USERS

ADD NEW   ☐ SAVE

USERNAME
Jane.Doe@xyzcorp.com

EMAIL
Jane.Doe@xyzcorp.com

ACTIVE
ON

← BACK

LOGO HERE  HELLO, TEST2@XYZ.COM

| DEALER # | DEALER NAME | | SALES MANAGER |
|---|---|---|---|
| TEST 2 | ABC ELECTRIC CO. | | JOHN DOE |

SELECT DIFFERENT DEALER

910

HOMEOWNER- PLATINUM: UPLOAD DOCUMENT

☐ SAVE

MY ACCOUNT/CO-OP CLAIMS

ORDER ▽ | CREATIVE PROOFS | CO-OP CLAIMS SUBMISSION

DEALER INFORMATION
> BUSINESS INFO
> CONTACT INFO

CO-OP CLAIMS SUBMISSION

CLAIMS TYPE    [SELECT ONE ▾]
    AMOUNT SPENT    [   ]
UPLOAD INVOICE & CREATIVE    [CHOOSE FILE | NO FILE CHOSEN]
    COMMENTS    [   ]

TAG INFORMATION
> CTAG INFO
> DEALER INFO

> VIEW ORDER/CO-OP CLAIMS SUBMISSION

*FIG. 29*

LOGO HERE *HELLO, JSMITH!*

LAWN COMPANY

932

URL & NAME OF PORTAL ☐ SAVE

> PORTAL SETUP
> > URL & NAME OF PORTAL
> > SET COLOR SCHEME
> > LOGIN PAGE
> > STOREFRONTS
> > LOGIN REDIRECTS
> > USERS
> > SETTINGS
> > LANGUAGE
> > COMMUNICATIONS

> MENU SETUP
> > PORTAL WORKFLOWS
> > SIGNUP WORKFLOWS

> SIGN-UP SITE SETUP
> > SEASONS
> > SIGNUP WORKFLOWS
> > TAGGING SECTIONS
> > TARGETING SECTIONS

> INPUT CLIENT DATA FILES
> > SELECT MAPPING

NAME: LAWN COMPANY
DOMAIN: LAWN COMPANY  .WEBSITE
CUSTOM DOMAIN: ⊗ INVALID DOMAIN

*LOGO HERE* HELLO, JSMITH!

LAWN COMPANY

WORKFLOW SETUP  ENGLISH (DEFAULT) ▽  💾 SAVE

| | |
|---|---|
| > PORTAL SETUP | INTRODUCTION — 1006 — 1008 [ON] |
| > URL & NAME OF PORTAL | SELECT DEALER — 1006 — 1008 [ON] |
| > SET COLOR SCHEME | PREVIOUS DEALER — 1006 — 1008 [ON] |
| > LOGIN PAGE | DEALER INFORMATION — 1008 [ON] |
| > STOREFRONTS | > BUSINESS INFO — 1006 — 1008 [ON] |
| > LOGIN REDIRECTS | > CONTACT INFORMATION — 1006 — 1008 [ON] |
| > USERS | > ALTERNATE CONTACT INFORMATION — 1006 — 1008 [ON] |
| > SETTINGS | TAG INFORMATION — 1008 [ON] |
| > LANGUAGE | > ADVERTISING TAG INFORMATION — 1006 — 1008 [ON] |
| > COMMUNICATIONS | > DEALER LOGO — 1006 — 1008 [ON] |
| > MENU SETUP | > OFFER INFORMATION — 1006 — 1008 [ON] |
| > PORTAL WORKFLOWS | ADVERTISING PLAN — 1008 [ON] |
| > SIGNUP WORKFLOWS | > PACKAGE — 1006 — 1008 [ON] |
| > SIGN-UP SITE SETUP | > SELECT MEDIA — 1006 — 1008 [ON] |
| > SEASONS | > CREATIVE THEME — 1006 — 1008 [ON] |
| > SIGNUP WORKFLOWS | > CREATIVE PIECE — 1006 — 1008 [ON] |
| > TAGGING SECTIONS | > TARGETING — 1006 — 1008 [ON] |
| > TARGETING SECTIONS | |
| > INPUT CLIENT DATA FILES | |
| > SELECT MAPPING | |

*LOGO HERE* HELLO, JSMITH!

*LAWN COMPANY*

EDIT CREATIVE TEMPLATE

SEASON > 2017 > CREATIVE TEMPLATES > EDIT CREATIVE TEMPLATE

ENGLISH (DEFAULT) ▽  ☐ SAVE

* CREATIVE TEMPLATE CODE

* MEDIA TYPES   ☐ $6,000   ☐ $10,000   ☐ $16,000   ☐ CUSTOM BUDGET

CREATIVE THEME

CUSTOMIZABLE?   OFF

DESIGN ON DEMAND TEMPLATE ID

* TITLE

UPLOAD NEW THUMBNAIL   [CHOOSE FILE] NO FILE CHOSEN
NOTE: A THUMBNAIL WILL BE GENERATED FOR PDF, JPG, AND PNG TEMPLATES IF ONE IS NOT UPLOADED

UPLOAD NEW TEMPLATE   [CHOOSE FILE] NO FILE CHOSEN

DISCRIPTION

☐ SOURCE

> PORTAL SETUP
  > URL & NAME OF PORTAL
  > SET COLOR SCHEME
  > LOGIN PAGE
  > STOREFRONTS
  > LOGIN REDIRECTS
  > USERS
  > SETTINGS
  > LANGUAGE
  > COMMUNICATIONS

> MENU SETUP
  > PORTAL WORKFLOWS
  > SIGNUP WORKFLOWS

> *SIGN-UP SITE SETUP*
  > *SEASONS*
  > SIGNUP WORKFLOWS
  > TAGGING SECTIONS
  > TARGETING SECTIONS

> INPUT CLIENT DATA FILES
  > SELECT MAPPING

LOGO HERE HELLO, JSMITH!

LAWN COMPANY

COMMUNICATIONS

| | | |
|---|---|---|
| DEFAULT FROM ADDRESS | EMAIL@ADDRESS.COM | |
| CC ADDRESS FOR ALL EMAILS | | |
| RESET PASSWORD EMAIL | | EDIT |
| DIRECT MAIL ORDER CONFIRMATION | | EDIT |
| AWARENESS ADVERTISING ORDER CONFIRMATION | | EDIT |
| UPDATED DEALER LOGO | | EDIT |
| NEW DEALER SUBMITTED | | EDIT |
| INITIAL MEDIA PLAN UPLOAD | | EDIT |
| INITIAL INDIVIDUAL PROOF UPLOAD | | EDIT |
| MEDIA PLAN CHANGES REQUESTED | | EDIT |
| CREATIVE PROOF CHANGES REQUESTED | | EDIT |
| MEDIA PLAN APPROVED | | EDIT |
| CREATIVE PROOF APPROVED | | EDIT |
| REVISED MEDIA PLAN UPLOADED | | EDIT |
| REVISED PROOF UPLOADED | | EDIT |
| TV PROOF MASS UPLOAD | | EDIT |
| AUTOMATED DAILY - AWARENESS MEDIA ORDER REPORT | | EDIT |

ADD NEW | SAVE

- 932

> PORTAL SETUP
  > URL & NAME OF PORTAL
  > SET COLOR SCHEME
  > LOGIN PAGE
  > STOREFRONTS
  > LOGIN REDIRECTS
  > USERS
  > SETTINGS
  > LANGUAGE
  > COMMUNICATIONS

> MENU SETUP
  > PORTAL WORKFLOWS
  > SIGNUP WORKFLOWS

> SIGN-UP SITE SETUP
  > SEASONS
  > SIGNUP WORKFLOWS
  > TAGGING SECTIONS
  > TARGETING SECTIONS

> INPUT CLIENT DATA FILES
  > SELECT MAPPING

CUSTOMIZED MARKETING WITH MICRO AND NANO GRANULARITY

CROSS-REFERENCE TO RELATED APPLICATION

This application claims priority to and the benefit of U.S. Provisional Patent Application Ser. No. 62/230,695 filed on Jun. 12, 2015, entitled Automated Customized Marketing with Micro and Nano Granularity, the entire disclosure of which is hereby incorporated by reference in its entirety.

FIELD OF THE DISCLOSURE

The present disclosure relates to a customizable mechanism for scaling/targeting marketing/advertising campaigns and for measuring their effectiveness at macro, micro, and nano spheres of performance. Specifically, this innovation resolves the problem of integrating the most local and subjective levels of a marketing decision under a universal branding umbrella to optimize objective institutional sales effectiveness and cost efficiency. Advertising decision-making and budget control can be parsed into geographic, demographic, media specific, and cost effective parts at micro or nano levels yet reconstructed into a strategically synergistic whole.

BACKGROUND

Mass marketing has gone through a renaissance with the proliferation of new media. Television, radio, and newspaper advertisements as well as coupon mailings have been effective at reaching millions, but do not offer the best engagement with the consumer. Technological advancements (e.g., mobile devices, the Internet of things, etc.) tend to pinpoint the exact moments and needs of consumers (e.g., location, retail searches, concerns, etc.) to supply consumers with the solutions they are looking for at any given moment. Arguably, with recent developments in connected and mobile devices, advertising will progress more in the next few years than it has in the past sixty years.

One current trend is for advertising to become more instantaneous both in terms of how the advertiser contacts the consumer and how the consumer purchases products and services. This is the generally accepted trend that high technology companies like GOOGLE®, YAHOO®, BING®, APPLE®, etc. are endeavoring to exploit. However, this trend simply tends to insert a mass market brand or advertising campaign into the moment automatically triggered by the consumer's actions or location bypassing the local brick and mortar retailer. Thus, no benefit or feedback is gained from the local brick and mortar retailer's hard earned expertise. The final result being of limiting the level of consumer's instantaneous engagement with a "one size fits all" advertising campaign simply inserted into the consumer's experience in an opportune time. Additionally, this technology often has the unfortunate consequence of "sticky" advertising where the instantaneous advertisements persist long after the consumer's moment of interest has expired. Thus, rather than advertising in the moment the consumer is repeatedly bombarded with out-of-date advertising information, which can become annoying.

A better approach is to enable a general mass market campaign to be tailored by local brick and mortar merchants to be more compatible with their micro or nano environments by using knowledge each merchant has accumulated over years of dealing with local consumers. Ideally, this localized knowledge would be coupled to the new technology instantaneous insertion advertising techniques for optimal consumer engagement. Incorporating this local level feedback into a particular macro (e.g., national) advertising campaign has proven to be prohibitively expensive and has also received push back from macro brand managers with concerns of dilution of their overall message or possible diversion off message in a way that might harm the macro brand. Additionally, any such micro/nano/macro must also accommodate funding and payment flow across the advertising hierarchy, which heretofore was not possible to manage at a variety of levels within the brand marketing from macro level to micro level. Amassing such disseminated knowledge and funds processing into an overall campaign much less disseminating it into an instantaneous insertion advertising campaign has, so far, proven to be a technically vexing if not impossible problem.

Thus, it is highly desirable for a new mechanism that has the flexibility to allow each company, its local corporate providers, its independent franchisees, or any subset of these or others to prepare, control/regulate, and execute a homogeneous marketing strategy depending on local circumstances, customer preferences, availability of various advertising media, the effectiveness of that media, and the cost of such execution.

SUMMARY OF THE DISCLOSURE

Objects and advantages of the disclosure will be set forth in part in the following description, or may be obvious from the description, or may be learned through practice of the disclosure.

Methodologies and systems are proposed to ensure the integrity and security of large-scale macro marketing campaigns that also enable affordable micro and nano local control granularity. This local control includes mechanisms that seamlessly integrate budgeted resources from the highest (macro) level of brand management to the lowest (nano) level. Additionally, this sphere of influence of local control can be expanded to include intermediate (micro) entities (e.g., distributors) that are either participating in or contributing resources to the advertising campaign.

Rather than simply having a corporate brand manager exercising detailed media buys in each media market that he or she may or may not be familiar with, the methods and systems disclosed herein allow for a pooling and flatting of resources across the advertising campaign hierarchy both in terms of budget and local (i.e., micro and nano) level feedback and control. Thus, options for financing and tailoring media campaigns are supported from macro national corporate brand managers on down to nano level local shopkeepers thereby enabling combinations of: multiple layers of cooperative funding sources, information on the cost effectiveness of choices to flow to all levels, and relating impending choices to past experience via multilevel feedback mechanisms. Applicants believe that heretofore this was simply not possible without the particular construct of the present systems.

While pooling and flatting resources across the advertising campaign hierarchy, the methods and systems disclosed herein also enable macro level corporate brand manager(s) to securely and confidentially access information on available advertising campaign budget contributions from micro level distributors and nano level local merchants thereby combining the resources from all potential participants, controlling who will control what fraction of the total allocation and then implementing the appropriate media buys in a fully customized and controlled fashion despite the fact that the resources have been combined. For example, local merchants may be empowered to order direct mail and locally designated Internet advertising within given sub-budgets while the corporate manager may reserve control of any statewide television campaign with half of the total budget.

Additionally, the methods disclosed also enable analytical tools to assess what is known (and will be known through dynamic synthesis of new information as it becomes available) to feedback information to an Artificial Intelligence (AI) compiler that applies the information to micro or nano level decision making. For example, assume a new study becomes available that determines the average lot size for residential properties in neighborhood "A" that will be one target area of a larger advertising campaign. Using the methods and systems disclosed, this study information would be compiled to compare the study information with the products (e.g., various sizes lawn mowers) controlled by the macro brand manager automatically alerting whatever parties making the marketing decisions at a macro, micro, or nano level of the optimal range of product models (e.g., bigger and more powerful mowers for large lawns, and smaller mowers for small lawns). Thus, the methods and systems disclosed automatically determine an optimal mix of media to enhance advertising delivery to the targeted market so that the maximum impact can be made for the least cost. In this example, the compiled end result might be a zip code wide email campaign or a pre-reel video offering on YouTube*tailored to individual IP (Internet Protocol) or street addresses. The complier may also, and typically does, adjust the campaign presented for possible selection based upon the type of advertising campaign such as a targeted sales campaign vs. an awareness campaign. Additionally, the compiler also typically adjusts and displays advertising campaigns that will fit a predetermined or established budget. The systems of the present disclosure, for example, will not display advertising campaign choices for a nationwide ESPN® television advertisements when the user's budget will not permit execution of such a campaign. In the case of the lawn mower example, if the campaign is to be delivered to too many households in a mailing such that it would be outside the budget, the system will inform the user. It will also be possible to compile non-traditional data such as weather data or pollen count data for a particular geographic area and present or time delivery of an advertising campaign based upon this non-traditional data. For example, an advertising campaign for antihistamine drugs or air conditioners may be activated based upon the pollen count reaching a certain level in a geographic region.

In one embodiment, a payment funding mechanism is created enabling macro entities to generally fund large-scale advertising campaigns with micro and nano entities making the actual purchasing decisions at their respective levels of influence. This funding mechanism allowing for a seamless flow of funds to all levels of the advertising hierarchy while at the same time limiting the amount of spending of each entity.

In a preferred embodiment, the methods and systems disclosed allow for an AI feedback performance metric enabling dynamic recalibration of the strategic media offerings factoring success rates. These performance metrics can utilize the AI feedback embodiment to dynamically evolve from baseline data (e.g., the number of clicks on an Internet advertisement), progressing to linking the baseline with other advertising feedback data as it becomes available (e.g., views of total video advertisements including percentage of total advertisement viewed), to tangible non-advertising data (e.g., number of units sold for a geographic area) as a function of type and volume of media utilized. In this embodiment, repetitive iterations evolve the metric as new information becomes available to input into the model.

Described are a number of computing mechanisms that provide practical details for reliably scaling and targeting marketing/advertising campaigns and for measuring their effectiveness at macro, micro, and nano spheres of performance.

BRIEF DESCRIPTION OF THE DRAWINGS

FIG. 3 is a conceptual illustration of a multi-dimensional media matrix that is part of the media advertising agency sub-system of FIG. 2;

FIG. 6 is a conceptual illustration of a two-dimensional single cell feedback matrix that is part of the media advertising agency sub-system of FIG. 2;

FIG. 7 is a conceptual illustration of a feedback display that is part of the media advertising agency sub-system of FIG. 2;

FIG. 11 is an exemplary administrative console screen displayed to a user via a webpage for an entity, in particular a nano entity, for an equipment dealer;

FIG. 12 is an exemplary start screen for setting up an individualized workflow for a dealer or distributor advertising campaign;

FIG. 13 is an exemplary mailing screen displayed to a user via an internet browser window allowing customized and targeted mailings to homeowners based on a variety of possible factors including geographic location or other factual feature of the target audience based on the particular good or service being marketed;

FIG. 14 is an exemplary advertising request platform where a user can request one or more of a variety of possible advertisements be generated for use in connection with the systems of the present disclosure;

FIG. 15 is an exemplary advertising selection display screen where a user can select one or more of a variety of advertising containing pre-approved creative templates consistent with the Macro Brand owner's guidelines and requirements for a given region;

FIG. 16 is an exemplary view of an internet browser window displaying a number of pre-packaged advertising packages that the macro entity has pre-approved for use by the micro entity (typically a dealer) or nano entity (typically the individual business) and, in this example, displays options for different market segments, namely small businesses and industrial businesses;

FIG. 18 is an exemplary status screen displayed to a user according to an aspect of the present disclosure that shows the status of all proofs and whether the proofs have been approved or not by the appropriate reviewer;

FIG. 19 is an exemplary screen that is displayed after activation of the magnifying glass or other link on the status screen shown in FIG. 18 and allows a user to review and approve a proof;

FIG. 20 is an exemplary reports screen that allows users, typically macro entity users, the ability to view orders placed to date, creative approvals, plan approvals, and media tactics that have been ordered;

FIG. 21 is an exemplary display screen for pre-packaged advertising that is already approved by a macro entity and selectable by a micro or nano entity for use and regulated customization within pre-established rules or guidelines set by the macro entity company, in this case a lawn and garden national brand;

FIG. 22 is an exemplary user input screen for the advertising selected that enables a user to customize, within the guidelines of the macro entity, the creative portion of the advertising that is selected according to an aspect of the present disclosure;

FIG. 23 is an exemplary dealer administration screen display that allows users with certain access to view various marketing initiatives that have been ordered or are ongoing according to an aspect of the present disclosure.

FIG. 24 is an exemplary targeted mailing selection screen which displays information by geographic region, in this case by zip code, and allows the user to select particular geographic region based on displayed demographic data such as average home income, average home value and population;

FIG. 25 is an exemplary agency review screen according to an aspect of the present disclosure;

FIG. 26 is an exemplary digital assets display screen according to an aspect of the present disclosure;

FIG. 27 is an exemplary user data and administration screen that allows an administrator at the marketing agency or the client, which would typically be a macro entity, the ability to review and edit access and levels of access based on each individual or based upon the title/authority of the user by class of user;

FIG. 28 is an exemplary Digital Asset Download display screen according to an aspect of the present disclosure, which provides a user with the ability to see all of the digital assets for the particular client, typically a macro entity, that have been produced based upon the type of marketing media the asset was produced for;

FIG. 29 is an exemplary co-op reimbursement display screen according to an aspect of the present disclosure that provides the ability for the user to upload invoices and ad proofs that they have placed for reimbursement approval;

FIG. 33 is an exemplary portal setup screen according to an aspect of the present disclosure;

FIG. 34 is an exemplary portal workflow setup screen according to an aspect of the present invention that allows for creation and editing of each page of the site including page headlines, left navigation titles, header information that is displayed, footer information that is displayed and other information to form a customizable marketing regulation site for the entire company or portion of a company;

FIG. 35 is an exemplary creative upload screen according to an aspect of the present invention that allows the entity, typically the macro entity, to upload pre-approved creative to be potentially used by the micro and nano entities to create their targeted and customized marketing materials; and FIG. 36 is an exemplary electronic mail setup screen according to an aspect of the present disclosure that allows for automatic email workflow communication according to the setup for each action or event.

DETAILED DESCRIPTION

Figure 1:
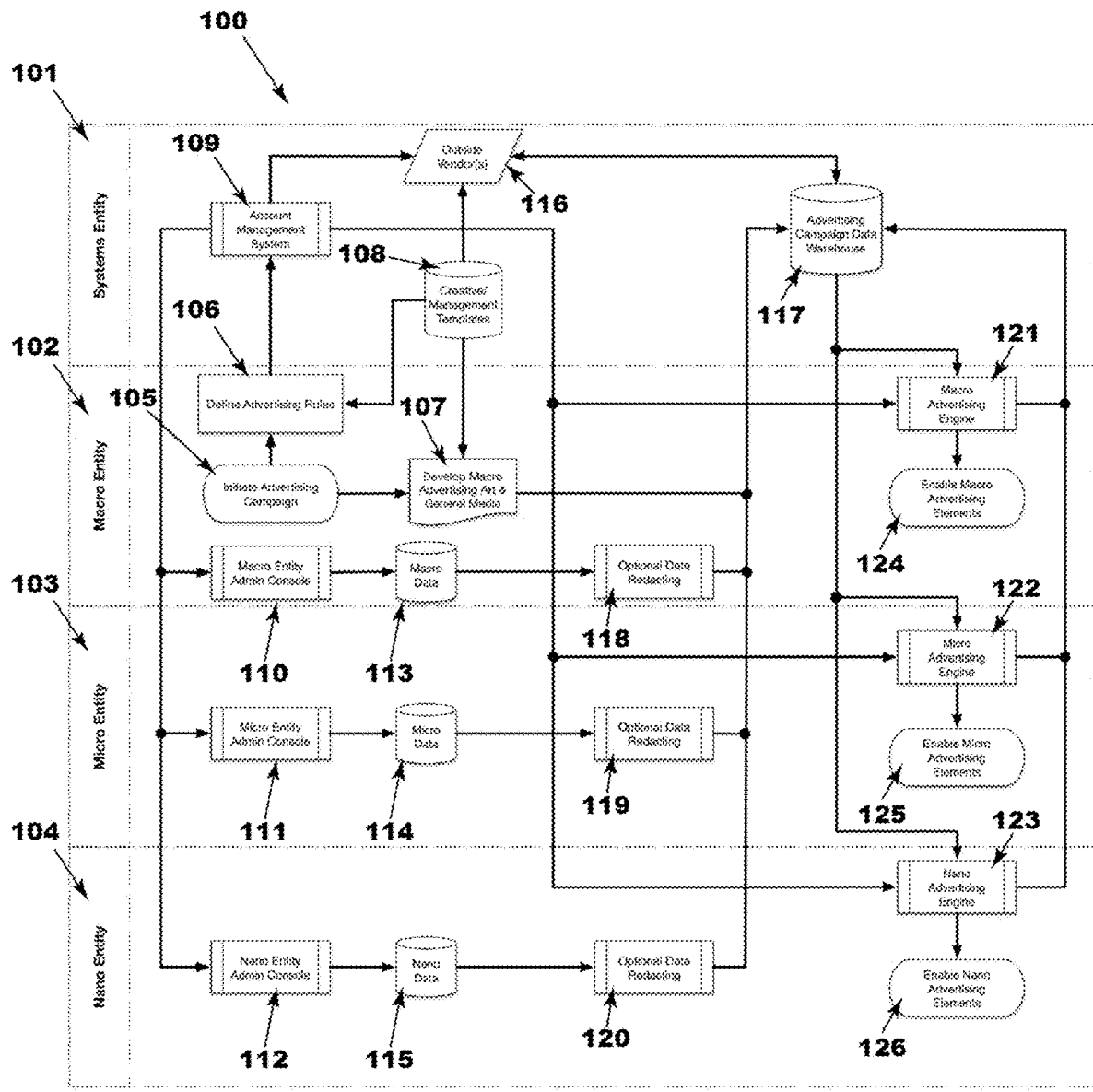
FIG. 1 is a block diagram providing a graphical overview of a first embodiment as a mechanism for scaling and targeting marketing/advertising campaigns at macro, micro, and nano spheres of influence.

A computerized advertising and promotion administrative system is constructed for operation via a communications network such as the Internet, with some or all of its components accessible via standard computing or mobile technology as desired. The administrative system is standardized for use by advertising agencies or corporate advertising administrators yet is customized via elected options programmed within the system such that its users can delegate decision making at various levels either within or external to their organization based on any single or complex set of criteria (such as but not limited to budgeted allowances) or parameters (such as but not limited to a licensed territory) supported by a database of chosen relevant information (such as but not limited to brand availability or media market rates). The system is supported by analytics providing feedback on effectiveness of past decisions for the same or similar market parameters and is accessible using specified criteria for the various sub-users within or external to the user.

Ensuring the security and operation of a coordinated advertising campaign across multiple groups requires segmentation, synchronized release of information, and intelligent feedback loops. By controlling both the advertising information available to each entity in a coordinated advertising campaign, as well as feedback data, a coordinated advertising campaign can occur that is both secured from alteration of key macro branding concepts as well as alterable at the micro and nano levels by personnel with applicable local knowledge who have authorization to do so.

In the context of this disclosure an entity can be defined as a digital computer server associated with a group. Thus, each entity could be a separate group with at least one user within each group accessing or controlling the overall macro advertising campaign. Alternatively, an entity can also be an individual Internet device (e.g., computer, iPad, smartphone, etc.) interacting directly with both the overall macro advertising campaign and other entities in the system.

An entity may also be a separate computing server managed by a group or host not participating directly in the macro advertising campaign, but serving only as a systems entity. Of course, an entity within the overall macro advertising campaign could also be the systems entity having the dual functionality of both systems entity and macro/micro/nano entity participating in the macro advertising campaign. Finally, there may be multiple groups participating in any one entity designation (i.e., "macro", "micro", or "nano").

Reference will now be made to one or more embodiments of the system and methodology of the disclosure as illustrated in the figures. It should be appreciated that each embodiment is presented by way of explanation of aspects of the disclosure, and is not meant as a limitation of the disclosure. For example, features illustrated or described as part of one embodiment may be used with another embodiment to yield still another embodiment. It is intended that the disclosure include these and other modifications that come within the scope and spirit of the disclosure.

Illustrated in FIG. 1 is a conceptual block diagram 100 that enables a coordinated advertising campaign across multiple groups. In FIG. 1, the various entities 101 systems, 102 macro, 103 micro, and 104 nano in the coordinated advertising system illustrated as horizontal rows running down the left-hand side of 100. FIG. 1 is arranged such that the functionality performed by a given entity is highlighted by the row (i.e., 101 thru 104) that the functions appears 100. In the context of this disclosure, a macro entity 102 may include (but is not limited to) various levels of management such as national or international brand or product managers as well as manufacturers. Micro entities 103 may include district managers, distributors, chain stores, etc. Nano entities 104 may include franchisees, sole proprietors, store managers within a chain, etc. Finally, systems entities 101 may include advertising agencies, Internet hosting services, etc.

The conceptual block diagram 100 of FIG. 1 begins with the macro entity 102 initiating an advertising campaign 105. This initiated advertising campaign 105 may be national, regional, or state level with the significant aspect being the planned advertising campaign may cut across the advertising campaign hierarchy thereby enabling pooling and flatting of resources at the nano 104 and (optionally) micro 103 levels. Once the advertising campaign 105 is initiated, a hierarchy of rules 106 will be established by the macro entity 102 to function as the guideline parameters for access and degrees of freedom to manipulate the advertising campaign by the nano 104 and micro 103 entities. In addition to a hierarchy of rules 106, the macro entity 102 may typically develop or collect the art and media components 107 to be used in the campaign. When formulating the rules 106 and/or developing the art and media 107 the macro entity 102 can optionally consult previously designed creative and management templates 108 for assistance in structuring the rules and art/media to seamlessly fit into the coordinated advertising campaign across multiple groups. As illustrated in this embodiment 100, the creative and management templates 108 are maintained by the separate systems entity 101. In alternative embodiments, the creative and management templates 108 could be maintained by the macro entity 102 itself or even by the micro 103 or nano 104 entities. However, these embodiments have the disadvantage of pushing the operation of the technical aspects of the advertising campaign, including portal and engine management to less experienced entities as well as placing control of the advertising campaign account management system 109, data warehouse 117, and outside vendors 116 within one of the entities participating in the campaign.

Once the macro entity 102 has defined the rule base 106 and created/acquired any applicable art and media 107, the macro entity 102 will upload the generated rules base 106 to the systems entity's 101 account management system 109 as well as any art/media to the systems entity's 101 advertising campaign data warehouse 117. Both the account management system 109 and advertising campaign data warehouse 117 are unique to a particular advertising campaign system 100 in regard to the data and parameters with the software or executable image generic for applications to multiple advertising campaigns.

The structure of the uploaded rules base is then executed by the account management system 109 and used, in part, to create administrative consoles 110, 111, and 112 for the various macro 102, micro 103, and nano 104 entities (respectively) that enable access and control of the coordinated advertising campaign across all groups. In addition to structuring and creating the administrative consoles, the account management system 109 also creates discrete advertising engines 121, 122, and 123 for the various macro 102, micro 103, and nano 104 entities (respectively) that execute the coordinated advertising campaign within each entity's designated sphere of influence. Aside from establishing the various entities' (102 thru 104) admin consoles (110 thru 112) and advertising engines (121 thru 123), the account management system 109 also establishes interfaces for any needed outside vendors 116. These outside vendors 116 include advertising venues (e.g., radio, television, etc.) as well as data sources (e.g., consumer information, geographical demographics, warranty information from advertising clients, art work, video production, etc.) that are loaded onto the advertising campaign data warehouse 117 for access and usage by the various entities' (102 thru 104). In addition to depositing data into the data warehouse 117, the outside vendors 116 may also receive data from the data warehouse 117 as well as generic management/creative templates 108.

Returning to the established administrative consoles (110 thru 112), the various entities' (102 thru 104) can then access the shared data warehouse 117 accessing and depositing information 113 thru 115 pertinent to the overall advertising campaign. Optionally, each entity (102 thru 104) may redact (118 thru 120) portions of uploaded data (e.g., consumer debit/credit card numbers) to ensure privacy and compliance with previous data sharing agreements. Typically, this form of redacting (118 thru 120) will leave any affected data fields intact with the sensitive data itself simply being replaced by generic fields (e.g., "X").

After the overall advertising system 100 is established, each entity (102 thru 104) will access its associated administrative console to interact with the system 100 as well as its own individual advertising engine (121 thru 123) receiving data from and providing data/feedback to the shared data warehouse 117 ultimately culminating with coordinated purchases and implementation (124 thru 126) of the advertising campaign within each entity's sphere of influence.

Figure 2:
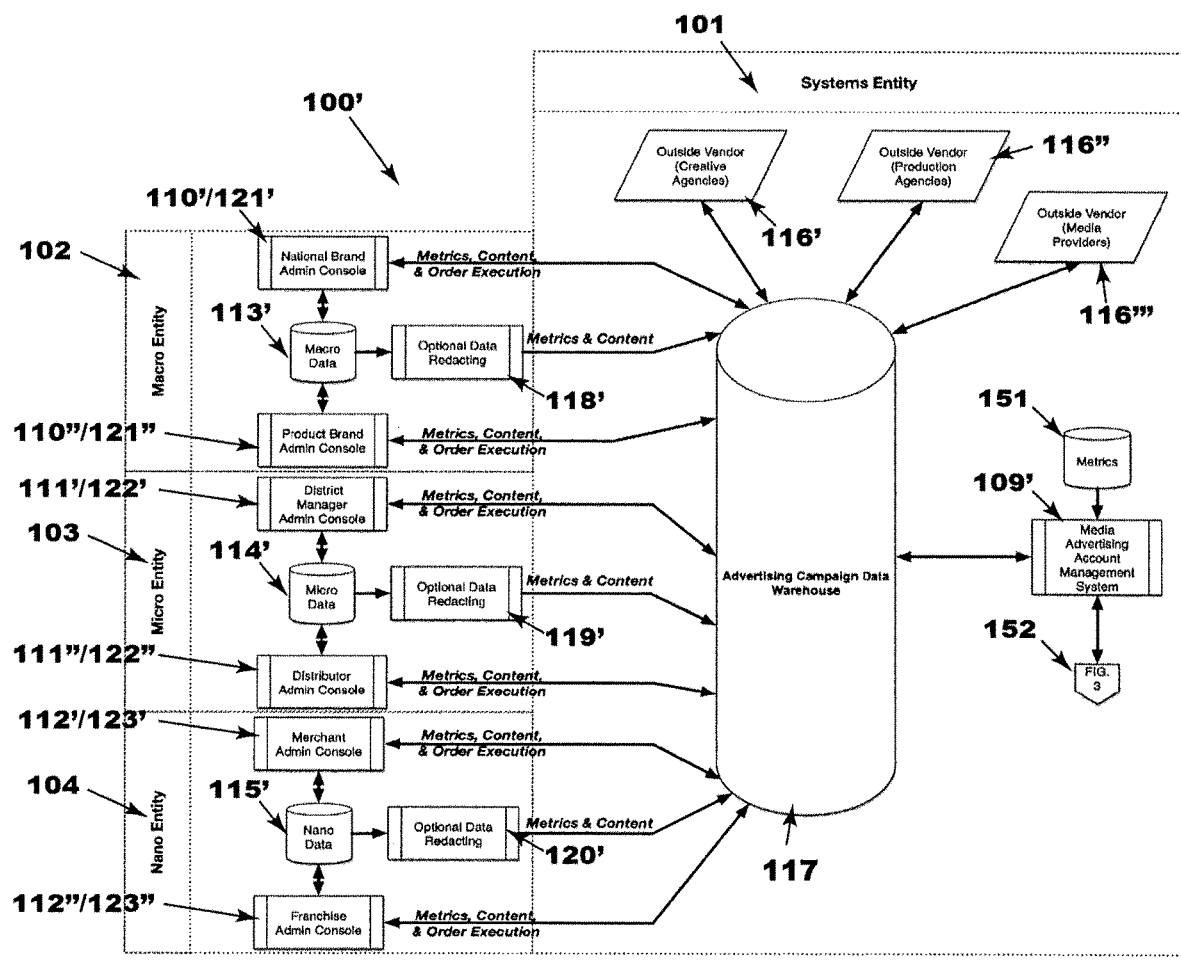
FIG. 2 is a flow chart of the entities in detail and the information exchanged in an operational FIG. 1 embodiment.

The flowchart for the coordinated advertising campaign system across multiple groups 100 is illustrated in FIG. 2 as embodiment 100'. In FIG. 2, the various entities 102 "macro", 103 "micro", and 104 "nano" in the coordinated advertising system illustrated as horizontal rows running down the left-hand side of 100' with the 101 "systems" entity illustrated vertically for simplification of data flow demonstration. FIG. 2 offers more detail concerning each entity. The macro entity 102 illustrates two sub-entities comprising a national brand manager administrative console/advertising engine 110'/121' and a product brand manager administrative console/advertising engine 110"/121". The micro entity 103 illustrating two sub-entities comprising a district manager administrative console/advertising engine 111'/122' and a distributor administrative console/advertising engine 111"/122". The nano entity 104 illustrates two sub-entities comprising a local merchant administrative console/advertising engine 112'/123' and a local franchise administrative console/advertising engine 112"/123". Finally, the systems entity 101 illustrates three outside vendor sub-entities comprising creative agencies 116', production agencies 116", and media providers 116''' with the account management system 109' being controlled by the media advertising agency functioning as the systems entity 101.

In FIG. 2 the macro data 113' and optional redacting 118', micro data 114' and optional redacting 119', and nano data 115' and optional redacting 120' are illustrated shared between the respective sub-entities, but in alternate embodiments could also be discrete. The media-advertising agency account management system 109' has its own interfaces to its metrics database 151 and multi-dimensional media matrix 153 (see FIG. 3).

As agreed by the sponsoring parties, each entity can be toggled into or out of the coordinated advertising campaign system 100' (FIG. 2) to examine advertising and promotion content and for purposes of placing media orders. For example, if the sponsors are a specific brand 110'/121' or product 110"/121" in a cooperative flight of advertisements with local merchants 112'/123', the toggles for order placing might allow only the local merchants 112'/123' and franchises 112"/123" to place advertisements with the financial cooperation of the brand 110'/121' or product 110"/121" manager, or might allow the brand/product manager to independently lend brand support to a locally tailored promotion. The micro levels 103 in between may or may not be allowed to examine content. However, all permutations of financing, cooperation, review, and order execution are allowed.

Each entity level (101 thru 104) may provide metrics (151 and 113' thru 115') such as sales counts or gross value of sales by product or brand as feedback to be used to establish a track record for success to be utilized as explained elsewhere. Additionally outside vendors 116', 116", and 116''' may also input data in a generic format to the advertising campaign data warehouse 117 or alternatively directly to participating entities. The outside vendors 116', 116", and 116''' carry out the orders on the creative to furnish finished art, digital content, video, audio, etc. to supply the content to coordinated advertising campaign system 100'. The order execution for placing the content with outside vendors 116', 116", and 116''' may rest at any entity level in the coordinated advertising campaign system 100'.

A coordinated advertising campaign system 100' multi-dimensional digital media matrix 152 (FIG. 3) is constructed by the media/administering agency 109' to be used to offer purchases of marketing campaigns to all levels of the management structure as authorized by the defined advertising rules 106 (FIG. 1). The results are displayed digitally as options to those entities authorized to receive them in the coordinated advertising campaign system 100' (FIG. 2) utilizing media availability as well as rates from the media providers. Changing rates and availability may be screened by the media/administering agency 109' or passed through in an automated fashion to the coordinated advertising campaign system 100' or any permutation of possibilities allowed defined advertising rules 106 (FIG. 1). However, in an alternative embodiment, the cognizant authority that initially established the defined advertising rules 106 may modify the rule base as the associated advertising campaign evolves. In addition to metrics feedback to the coordinated advertising campaign system 100' (FIG. 2), additional data from rating agencies, polls, surveys, published and private research may be incorporated into the advertising campaign data warehouse 117.

FIG. 3 shows an embodiment of a multi-dimensional digital media matrix 152' diagrammatically illustrating how various forms of media can be enabled for a given advertising campaign with respect to the various entities. In FIG. 3 the first column 201, the various forms of media (e.g., Internet 207, print 208, television 209, radio 210, telemarketer provider 211, public relations events 212, etc.) are listed associated with column 202 types of media and (if applicable) column 203 sub-types of media. The various entities that may be authorized to execute orders for media placement depending on the defined advertising rules 106 (FIG. 1) are listed in column(s) 204 (macro), 205 (micro), and 206 (nano). As its name implies, the multi-dimensional digital media matrix 152' is not necessarily limited to a two dimensional embodiment. For example, any given cell 220 in the multi-dimensional digital media matrix 152' could include other dimensions such as day or time availability for some media like radio and television (e.g., FIG. 4) or weekly for newspapers, perhaps monthly for magazines, or real time digital messaging as a request is made.

Figure 5:
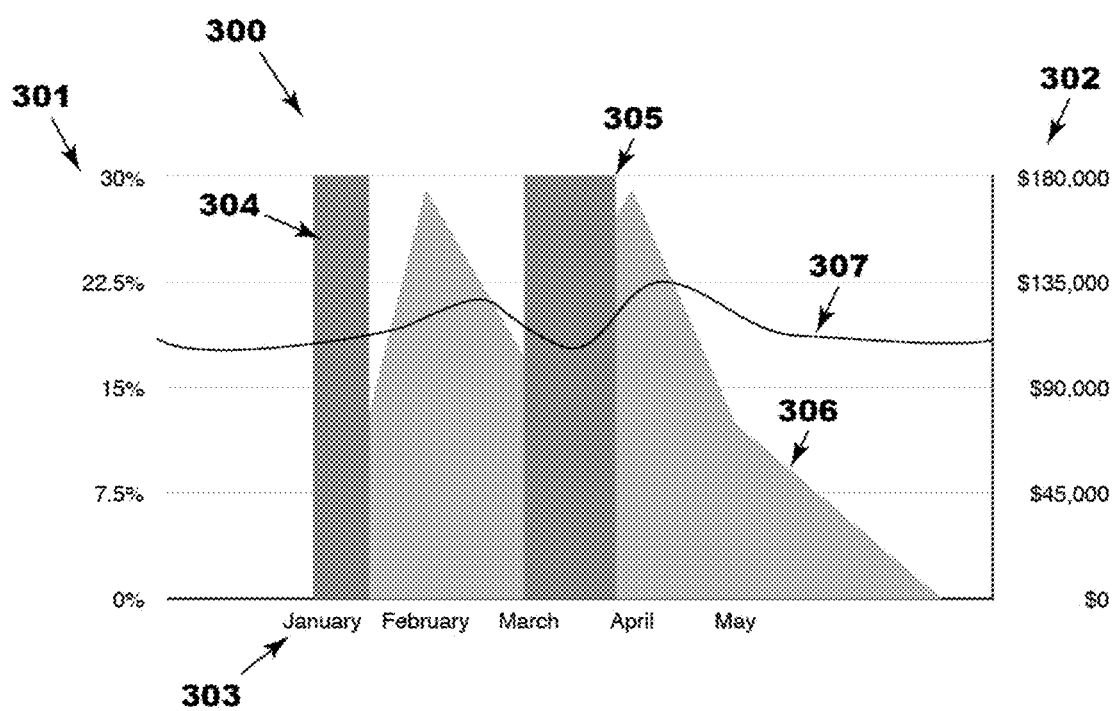
FIG. 5 is a conceptual illustration of a metric tracking example incorporated into the media advertising agency sub-system of FIG. 2.

The multi-dimensional digital media matrix 152' of FIG. 3 is constructed of cells. In one dimension are the various forms of media (e.g., column 201—Internet 207, print 208, television 209, radio 210, etc.) with applicable sub-types. In another dimension are the various entities 204 thru 206 that may be authorized to execute orders for media placement depending on the defined advertising rules 106 (FIG. 1). Other dimensions (e.g., time/date) are possible, but are not illustrated in FIG. 3. Each set of coordinates comprises a cell (e.g., 220). Each cell in itself may embed one or more dimensions. For example, in one embodiment one television cell may embed time periods (e.g., 7 AM to 9 AM ABC® national TV news) that are only accessible by the macro 204 brand(s) or product manager(s). In another dimension the cost of a 15 second national commercial media buy could be embedded in comparison to the cost of a 30 second buy. Other dimensions may also contain the name of the program, its Nielson rating, and tracking indices derived from the metrics feedback mechanisms of sales tracking record verses former similar media purchases (FIG. 5). As is apparent to one skilled in the art, not every cell will have an entry for every advertising campaign. For example, the multi-dimensional digital media matrix 152' may have no entries for television time slots other than news if news is specified in the defined advertising rules 106 (FIG. 1) as required for the advertisement.

Figure 4:
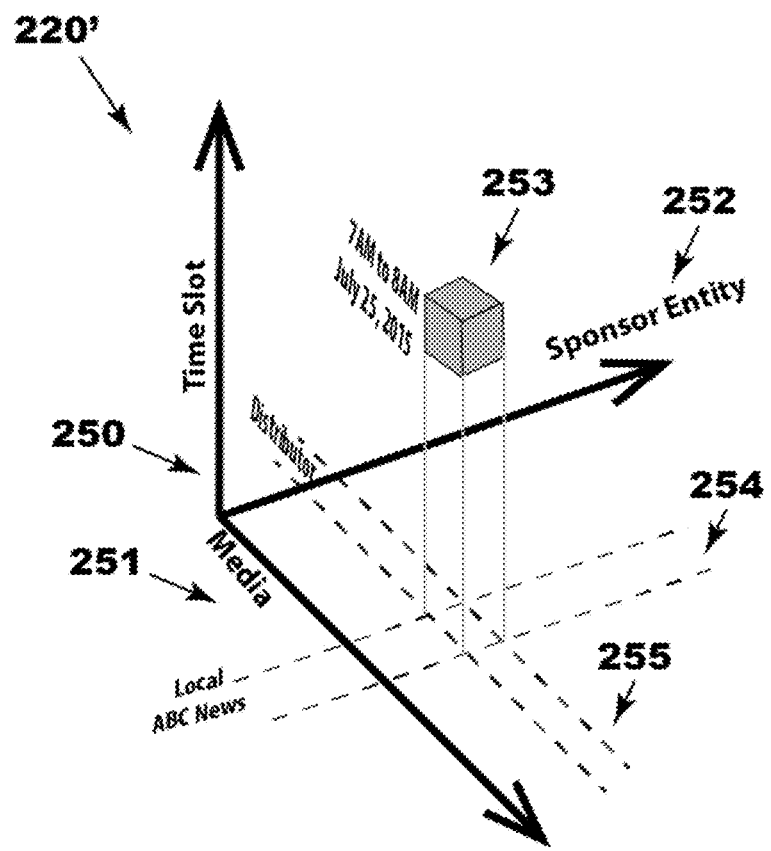
FIG. 4 is a conceptual illustration of a three-dimensional media matrix that represents a cell in the multi-dimensional media matrix of FIG. 3.

FIG. 4 is a three-dimensional media matrix example 220' representing embedded dimensions to cell 220 from FIG. 3. The three-dimensions of the embedded media matrix 220' are: time slot 250, media 251, and sponsor entity 252. Cube 253 diagrammatically highlights the time slot of 7 AM to 8 AM on 25 Jul. 2015 ABC® local news 254 that was purchased by the distributor micro entity 255.

A key advantage of the coordinated advertising campaign system 100/100' is its inherent feedback capabilities. Among other features these feedback capabilities enable metric tracking of ongoing and previous advertising campaigns. For example, FIG. 5 illustrates 300 a previous coupon campaign showing the timing of the previous coupon campaign 303, the coupon issuing periods 304 and 305 as the number of coupons, the redemption rate 306 as a percentage 301, and the resulting sales trends 307 in terms of actual sales 302. By algorithmically comparing actual sales on a scale against other historically used options the cost effectiveness of a given advertising program becomes readily apparent.

The feedback to the coordinated advertising campaign system 100/100' accepts various metric data from varying independent sources (e.g., ratings, click rates, coupon redemptions, sales changes, etc.) as they become available with respect to time, location, weather, and other applicable dimensional parameters. The coordinated advertising campaign system 100/100' then plucks and calculates relevant comparative results for reverse feedback views by sponsoring macro entities. FIG. 6 illustrates an embodiment of one such reverse feedback view 325. In the example of 325, a two-dimensional metric feedback display illustrates the metric type 326, sub-type 327 (if applicable), and various geographical areas ranging from zip code 328 thru national 331 and possibly beyond 332. As shown in FIG. 6, the various media types 326 establish rows 333 revealing the parameters of the metric type relative to geographical distribution thereby providing here to un-utilized granularity to the macro, micro, and nano entities. A practical example of the reverse feedback view 325 of FIG. 6 would be macro entity tracking lawn tractor and lawn mower sizes most relevant to the predominant lot size for a particular zip code and then comparing the results for a given zip code to larger geographical areas.

Another embodiment of a reverse feedback view 350 is illustrated in FIG. 7. In the example of embodiment 350, the coordinated advertising campaign system 100/100' recognizes zip codes, 50309, 50311, and 50312 as residential neighborhoods with young families with higher than average numbers of children. The macro manager of a dairy has defined advertising rules 106 (FIG. 1) that authorizes spending $2,000 on print advertising. The embodiment of 350 (FIG. 7) accepts the $2,000 buy 352, displays the cost 366 of freestanding inserts specifying size and other parameters 353 with coupons for 10% off on milk purchases for January 351. Three priority zip codes 354, 355, and 356 are targeted and a fourth 357 with a lower index 361 (then the targeted three 358 thru 360) is included to round out the purchase.

Of course, the funding mechanism for multi-tiered advertising systems is inherently complicated due to the multiple entites that could potentially be allowed to fund the advertising pool, authorize payments and have a multiplicity of payment recipients. By parsing general funding into discrete payment components with associated redemption codes, general funds can be safely drawn down for appropriate purchases (e.g., television air time, newspaper advertisements, pop-up view fees, etc.) without endangering the overall budget.

Figure 8:
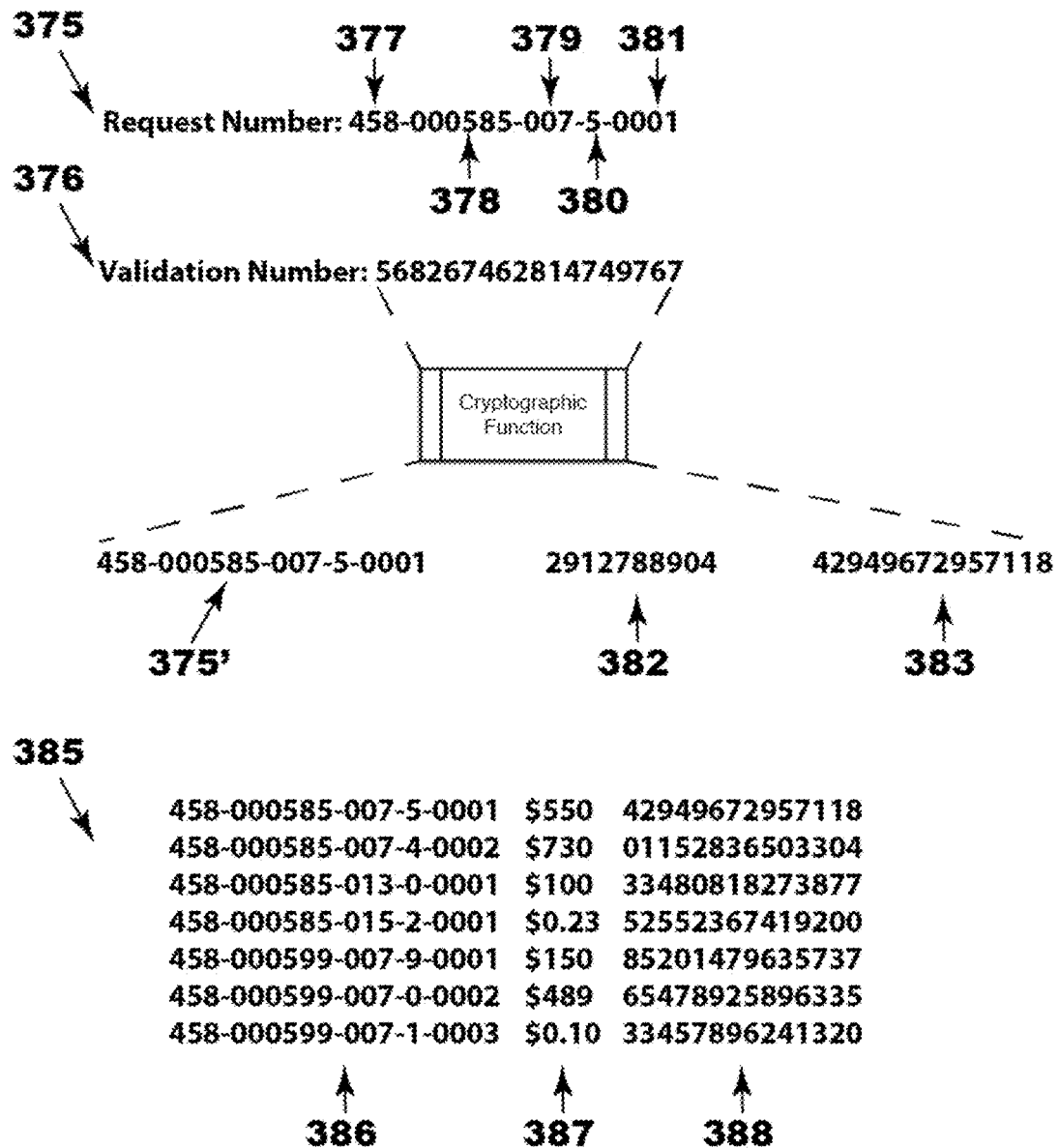
FIG. 8 is an exemplary illustration of request and validation numbering utilized for advertising payment processing.

In a preferred embodiment, this funding mechanism would utilize redemption/authorization codes such as request and validation numbers—FIG. 8. In this embodiment, a request number 375 would be issued allowing the funds management sub-system 400 (FIG. 9) to track the allocation of specific funds to a specific advertising medium (e.g., newspaper, television ad, Internet click, Google search, etc.) Ideally, the request number 375 (FIG. 8) would be of a composite construction thereby enabling tracking and sorting by both the computer system as well as humans.

For example, as illustrated in FIG. 8 the request number 375 could be a composite of: an advertising campaign number 377 identifying the specific advertising campaign funding the payment, a region number 378 identifying the geographic region that the advertising media is to be deployed, the entity controlling the payment 379, a modulo check digit 380 to protect data integrity in the event the request number is handled by humans, and a sequential number 381 differentiating tracking numbers that have the same previous criteria.

In addition to the request number 375, in this preferred embodiment, a separate validation number 376 would be issued that would effectively authorize payment from the sub-system. This separate validation number 376, would be ideally generated by a cryptographic function (e.g., Secure Hash Algorithm—SHA, Advanced Encryption Standard—AES, etc.) that would utilize the cleartext request number 375', cryptographic salt 382, and a secret key 383 as its inputs. The resulting hash/ciphertext comprising the validation number.

In this preferred embodiment, the payment sub-system database could be arranged by request number 386 with the budgeted amount 387 allocated the requested number logged with the request number. Thus, when a payment is tendered for media services rendered, presentation of the validation number 388 by either an outside media provider or the cognizant macro, micro, or nano manager would trigger an automatic payment of the specified amount 387 to the outside media provider specified by the request number 386.

Figure 9:
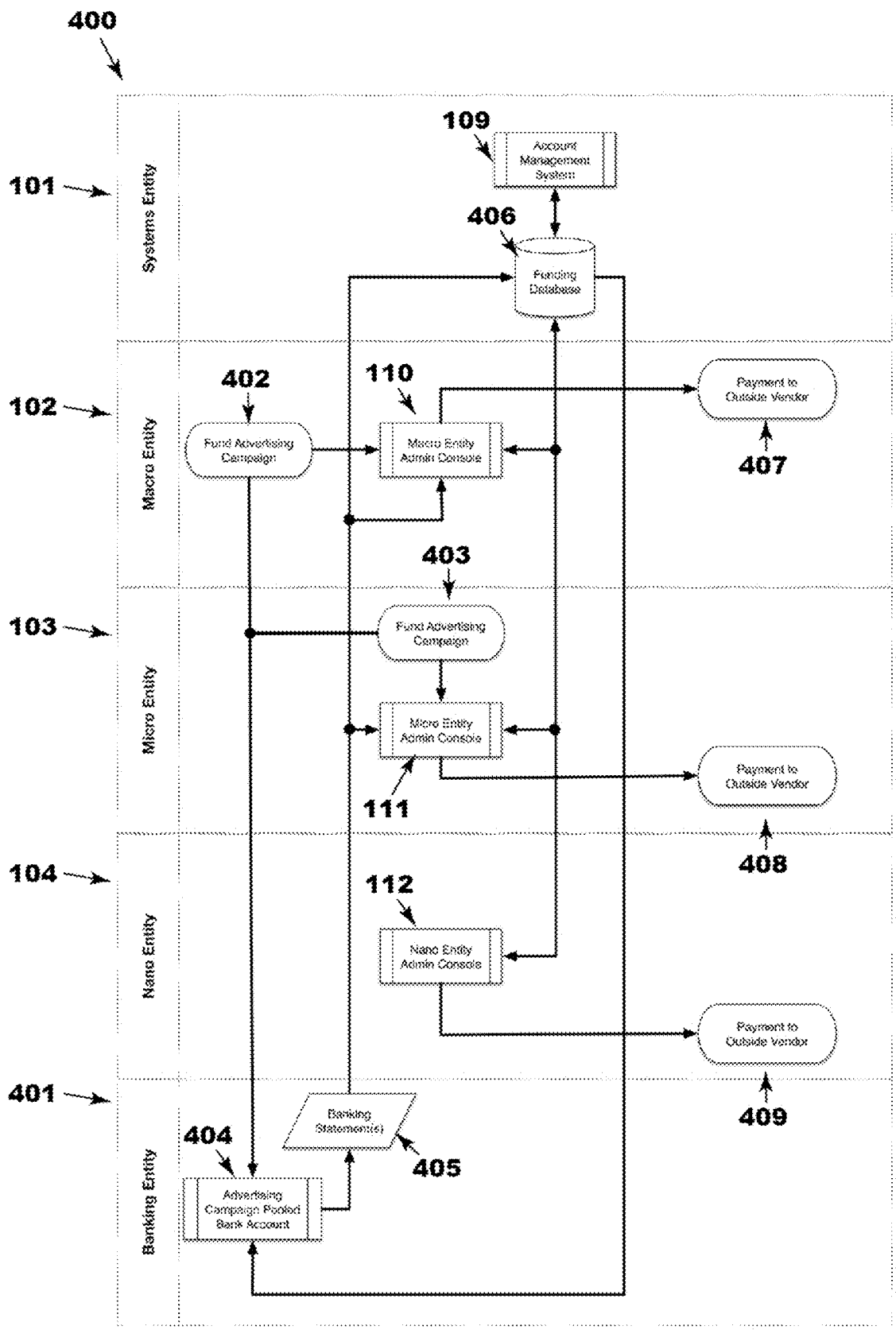
FIG. 9 is a block diagram of the advertising payment subsystem compatible with the FIG. 1 embodiment.

The preferred embodiment request 375 and validation 376 numbers would be processed by system 400 (FIG. 9). FIG. 9 is a "swim lane" flowchart where the entity responsible for a given function is identified by the row the function appears. The rows are arranged with systems entities 101 at the top progressing downward to macro entities 102, micro entities 103, nano entities 104, and ending with banking entities 401 in the final row.

When an advertising campaign is initiated the one or more parties agree on the overall budget and supplies the associated funding, either at the start or in incremental portions as the advertising campaign progresses. As shown in the example of embodiment 400 in FIG. 9, the macro entity 102 initiates funding 402 with some or all funds being deposited in a specified account 404 maintained by the banking entity 401. In this example, a micro entity 102 also provides a portion of the overall funding 403 to the pooled bank account 404. Whenever funds (402 and 403) are deposited into the pooled bank account 404, a record of the deposit is logged on the associated entity's administrative console (e.g., 110 for macro entity 102 and 111 for micro entity 103) with banking statements 405 issued by the banking entity 401 confirming the deposit(s) as well as being used for pooled account balancing. This deposit data is also uploaded to the funding database 406 maintained by the system entity 101. As shown in the figure, administration 109 of the funding database 406 is ideally provided by the system entity 101.

As the advertising campaign progresses, various media purchases are executed by the macro 102, micro 103, and nano 104 entities with purchase requests all coordinated through the funding database 406. Assuming sufficient funds are available/budgeted for the given entity's purchase, a request number 375 (FIG. 8) is generated and logged on the funding database 406 (FIG. 9) with the request number given to the desired media vendor as a purchase order. When the media purchase is completed, the associated validation number 376 (FIG. 8) is released with the allocated funds 387 transmitted from the pooled bank account 404 to the specified media vendor 407, 408, or 409 (FIG. 9) as ordered from the respective macro 102, micro 103, or nano 104 entity.

In an alternative embodiment, the pooled account is funded as previously. With the respective macro 102, micro 103, or nano 104 entities distributing the request and validation numbers (375 and 376—FIG. 8) to the media vendors as payment 407, 408, or 409 (FIG. 9). In this embodiment, the validation code(s) redistributed to the media providers enables electronically debiting from the pooled bank account 404. Thus, in both embodiments, only those with validation codes have access to funds. Each transaction is recorded as to fund provider, decision maker, geographic territory, and media outlet by virtue of the request/validation numbers (375 and 376—FIG. 8).

In another alternative embodiment, the denomination of the funds is only limited and not fixed because each purchase is bid separately by each media outlet and each has differing cost basis, serves varying size areas, etc. However, each pair of request/validation numbers (375 and 376—FIG. 8) has a limit for the debit transaction as set by the type of media to be purchased—i.e., the payout is never more than 100% of the limit either individually or in aggregate.

In all embodiments, the funding mechanism 400 (FIG. 9) subsystem distributes the request/validation numbers (375 and 376—FIG. 8) as per programming for a particular campaign. No number pair can be redeemed more than once. Ideally, the subsystem keeps track of the ebb and flow of funds as per the information embedded in the request number 375 and maintains the funding database 406 (FIG. 9) to coordinate subsequent sales figures by retailers or distributors to gauge the effectiveness of the components and the campaign overall use in scaling options for empowered decision makers in the future via AI or human interaction. Of course, there are other variations of the disclosed embodiments (e.g., embedded dimensional controls) that are obvious to anyone skilled in the art.

Figure 10:
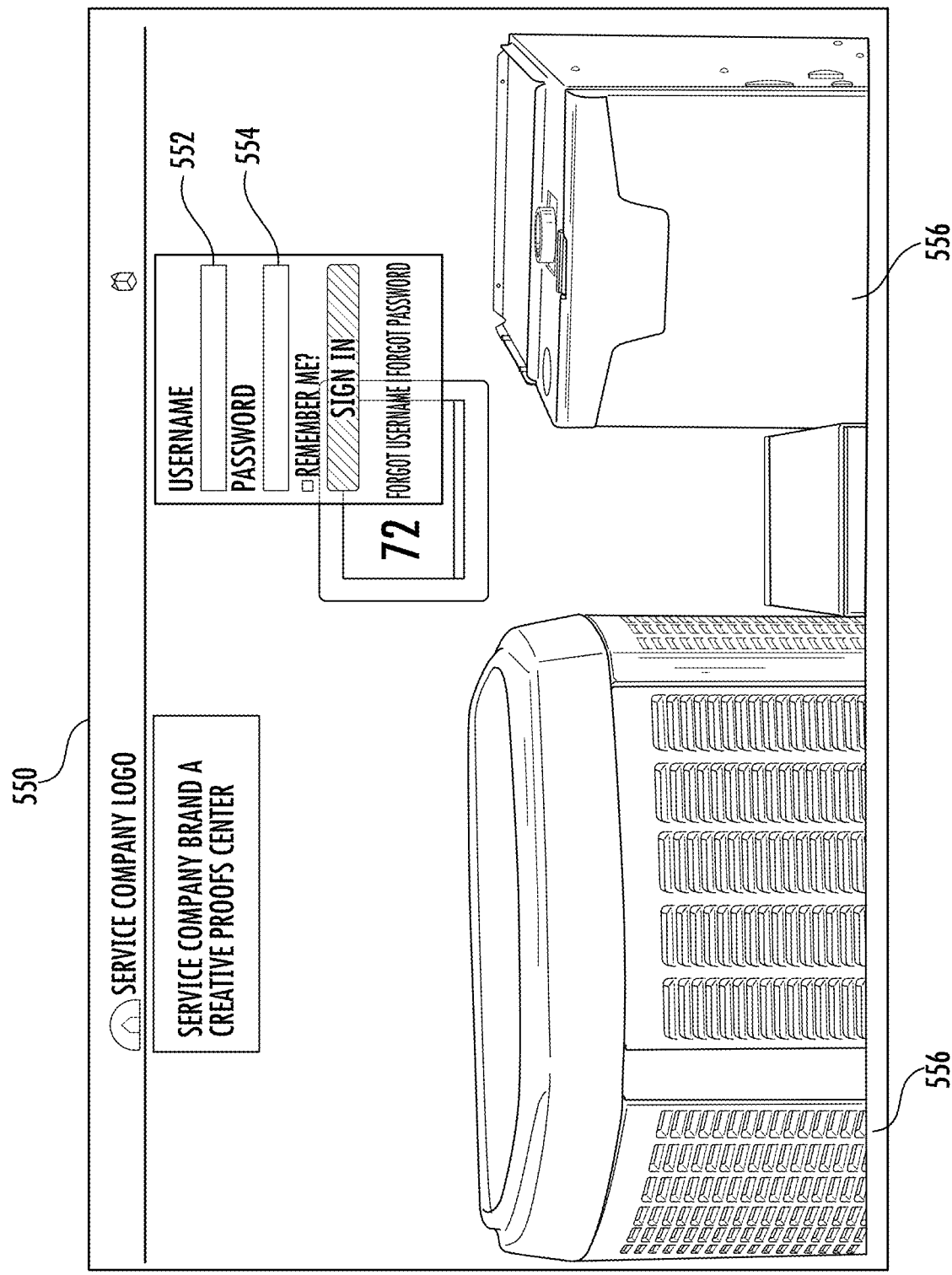
FIG. 10 is an exemplary user-input screen of a user credentially webpage that is displayed to the user of a local computer or server when the user accesses a particular internet address, which queries a remote server system that contains the system of the present disclosure. The credentially webpage regulates access depending on the business role the user fulfills such as Branch Manager, Corporate Administrator, Field Marketing Manager.

FIG. 10 shows a first exemplary embodiment. Shown is a login screen 550 for a HVAC service company, "Service Company Brand A." Login screen 550 may be a common login screen for users at every level within the account. For instance, the systems entity 101, the macro entity 102, the micro entity 103 and the nano entity 104 all may go to a common website address, for instance ServiceCompanyBrandA.com, and see this same login screen, no matter who it is that is logging in. The login screen may have a username field 552, a password field 554, and digital assets 556 in graphical form that apply to that particular client, along with any other information the account holder wishes to display. The entity that logs in is then sent to an administrative console (110, 111, or 112) that applies to that respective entity. In the instance of a service company, the macro entity 102 may be a Corporate Administrator, micro entity 103 may be a Field Marketing Manager, and the nano entity 104 may be a Branch Manager.

FIG. 11 shows another exemplary embodiment, showing an administrative console screen 612 for a nano entity 104 for an equipment dealer, e.g. General Power Equipment. The administrative console screen 612 may include a navigation links section 620, a main body section 622, and a header section 624. The navigation links section 620 is shown along the left-hand side of the administrative console 612, the header section 624 is shown along the top, and the main body section 622 is shown taking up the bulk of the screen generally in the middle, but they may also be located in any location a client wishes.

The navigation links section 620 may display the options that the particular entity, in this case the nano entity 104 which may be an equipment dealer, has access to a number of screens that are pertinent to that particular dealer. This may include the individual dealer information, account information within the larger group, order information such as unfulfilled orders, past fulfilled orders, and incomplete orders, and other data such as which users are able to see and edit this information, notes from the dealer or other entities, and market data based on current and past advertising campaigns.

The dealer or nano entity 104 may have access to a number of individualized data in the body section 622 that is particular to that specific dealer, such as name, address, and dealer group. The dealer or nano entity 104 may have access to this information, although they may not have the ability to change or update it. For instance, the dealer group and territory manager fields may be set by an entity above the nano entity 104, but still available for reference to that entity. The header section 624 may display general client-based or entity-based information such as a corporate logo, corporation name, dealer number, dealer name, and distributor, or any other general data the client wants or requires.

Another exemplary embodiment detailed in FIGS. 12 and 13 details an individualized workflow setup for a dealer or distributor advertising campaign that may be started by a nano entity 104. In this case, the nano entity 104 may be Lawncare CO/Equipment CO. It should be known that the advertising campaign may also be started or kicked off by any other entity as well. The dealer campaign may also be a part of a larger corporate-wide or territory-wide campaign that was kicked off by an entity above the dealer or nano-entity 104. As shown in FIG. 12, the campaign may be started at a screen 701. At this screen 701, a workflow may selected. FIG. 12 displays an option for direct mail advertising and an option for awareness advertising, but it should be known that any other form of advertising may be added and chosen from this screen 701.

FIG. 13 displays a mailing screen 702 that may be shown if the direct mail advertising option is chosen from FIG. 12. On the mailing screen 702, there may be a header 703 with information describing the campaign, the type of mailing (e.g. postcard), the type of campaign (e.g. One Day Sales Event), and the name of the dealer (e.g. Lawncare CO/Equipment CO). The main body 704 of the mailing screen may include text or notes 705 with notes from previous campaigns, or rules as set by the systems entity 101, the macro entity 102 or corporate head, or the micro entity 103 or territory manager. Below the notes or text 705 may be shown details of the mailing targets. As shown by FIG. 13, targets may be sorted by ZIP code, distance from dealer, and size of the property lots owned by the targets. It should be known that any other information that is available to the system may be included in the sort, such as size of families, past purchases of equipment, or any other data the client deems relevant to the sorting process.

Figure 15:
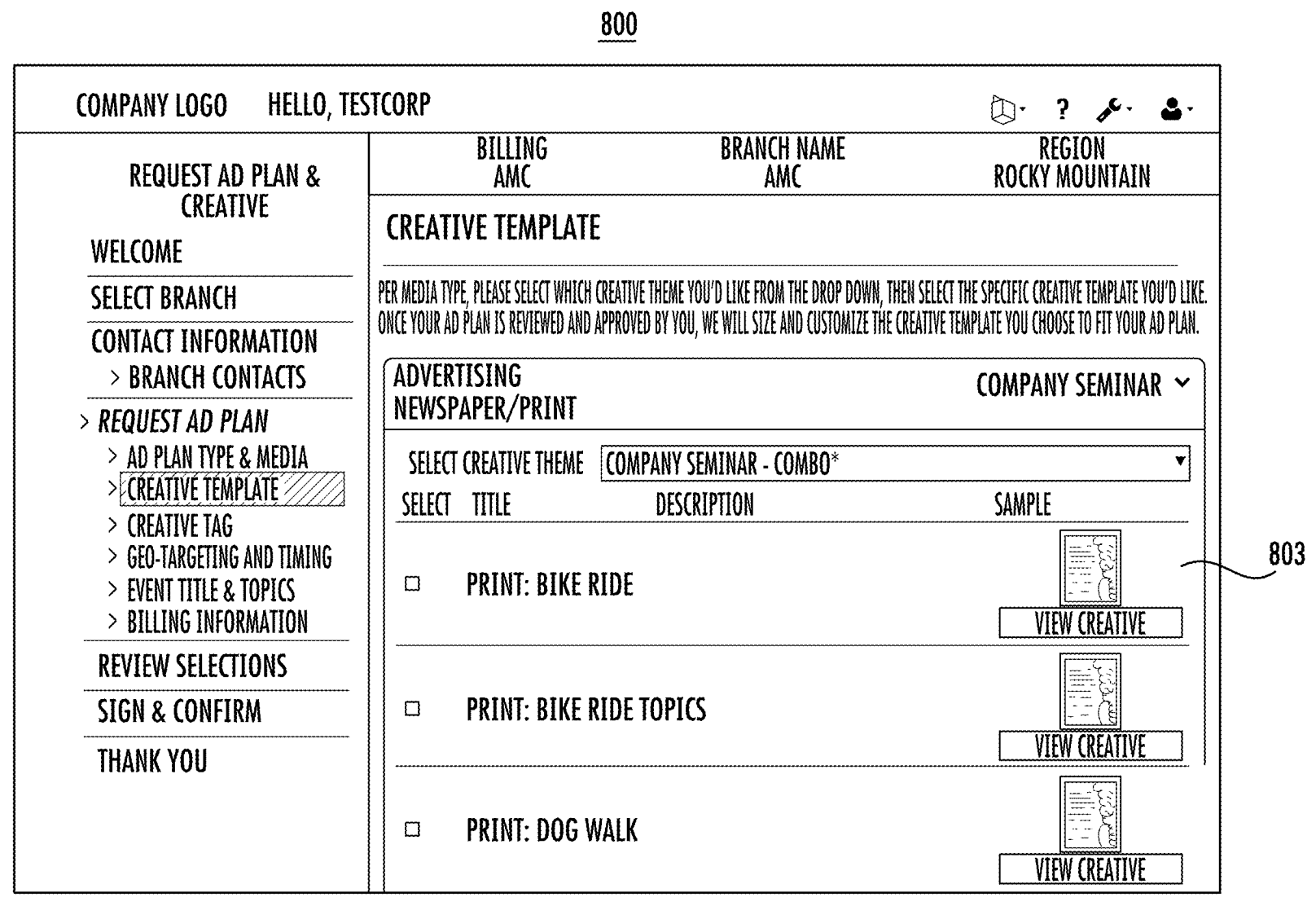

In still another exemplary embodiment shown in FIGS. 14-15, an advertising request platform 800 is detailed. In the advertising request platform 800, an entity (e.g. a medical instrument company, Testcorp) requests the advertising agency or systems entity 101 to create an advertising campaign. A Testcorp entity 102, 103, or 104 may access the screen 801 and add as much or as little detail about the campaign as they may have at the time. Like other screens, screen 801 may have a header section 804 which shows general information about the company such as a logo, and billing, branch and territory information. Screen 801 may also have a navigation screen 802 for accessing different types of data, such as plan types, templates, targeting and timing, coming events, and other billing information. Navigation section 802 may also contain options to review orders, sign and confirm orders, and to send thanks. All of these sections may be customized such that different entities may have different access to display and edit different options.

In a main body portion of the advertising request screen 801, a client entity may input details such as budget, campaign name, and campaign media such as TV, radio, internet campaigns and others. FIG. 15 shows a possible main body section 803 when the creative template option is chosen from the navigation section 802. In this option, the entity or client may choose from one or more predetermined templates, or create a new template from existing digital assets such as print graphics.

FIGS. 16-20 detail another exemplary aspect of the present disclosure as it relates to an equipment dealer, Testcompany2. As shown in FIG. 16, Testcompany2, which would typically be a macro entity, created and established a number of pre-packaged advertising options for the nano entities or dealers to choose from. In this embodiment, the macro entity 102 or the micro entity 103 exerts more control over the advertising campaign by creating the packages and distributing them to the dealers 104. The nano entities or dealers 104 may then review information such as remaining budget and past results from campaigns from the system in real-time, and choose the option that best fits their local advertising strategy. In this way, a macro entity 102 has the ability to control the message as much or as little as they like, while still allowing the dealers 104 to maximize their advertising budget.

Figure 17:
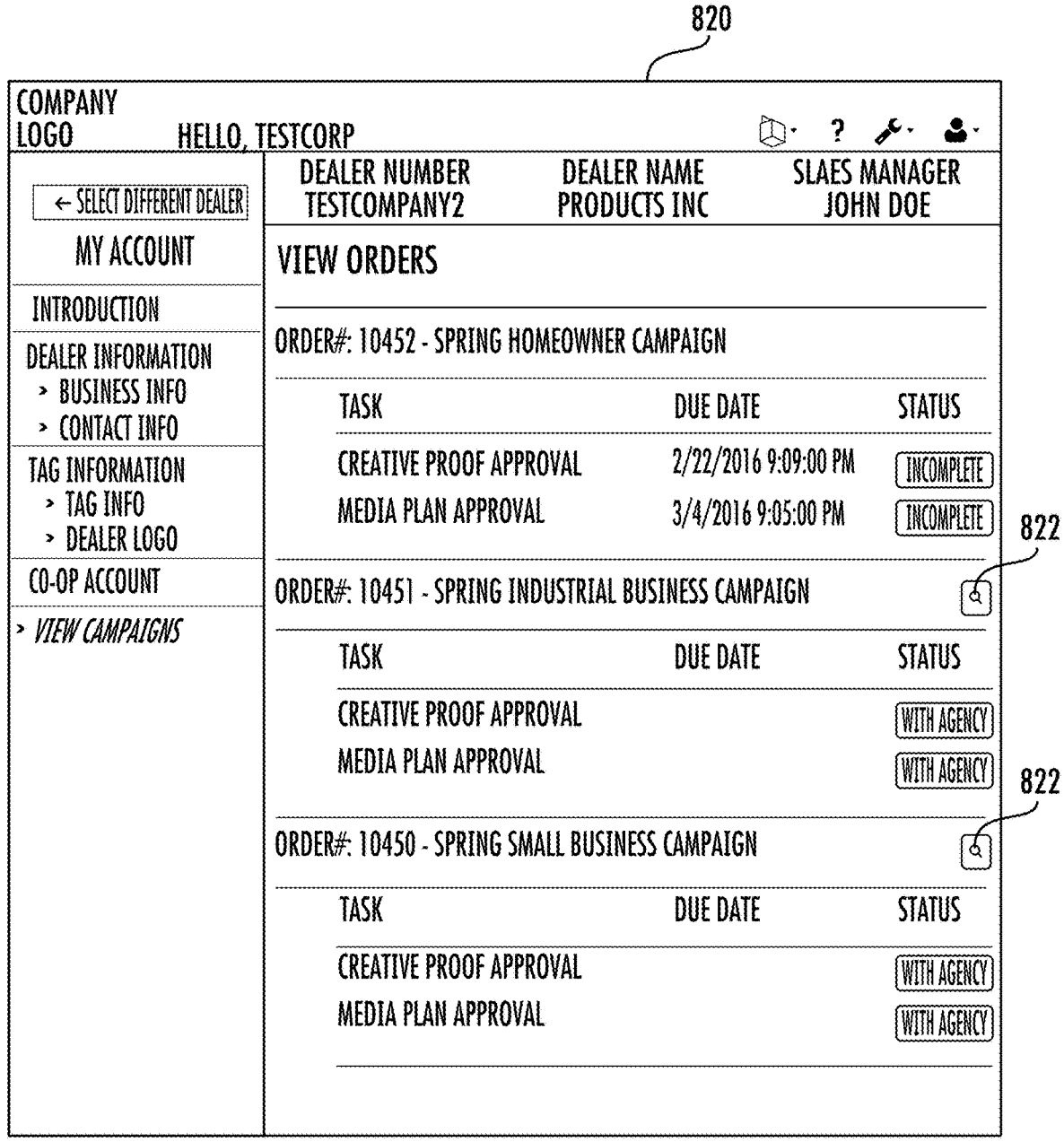
FIG. 17 is an exemplary account history page displaying past marketing campaigns and their current status and past history of all orders and requests submitted by a user.
Figures 18, 19, 20:
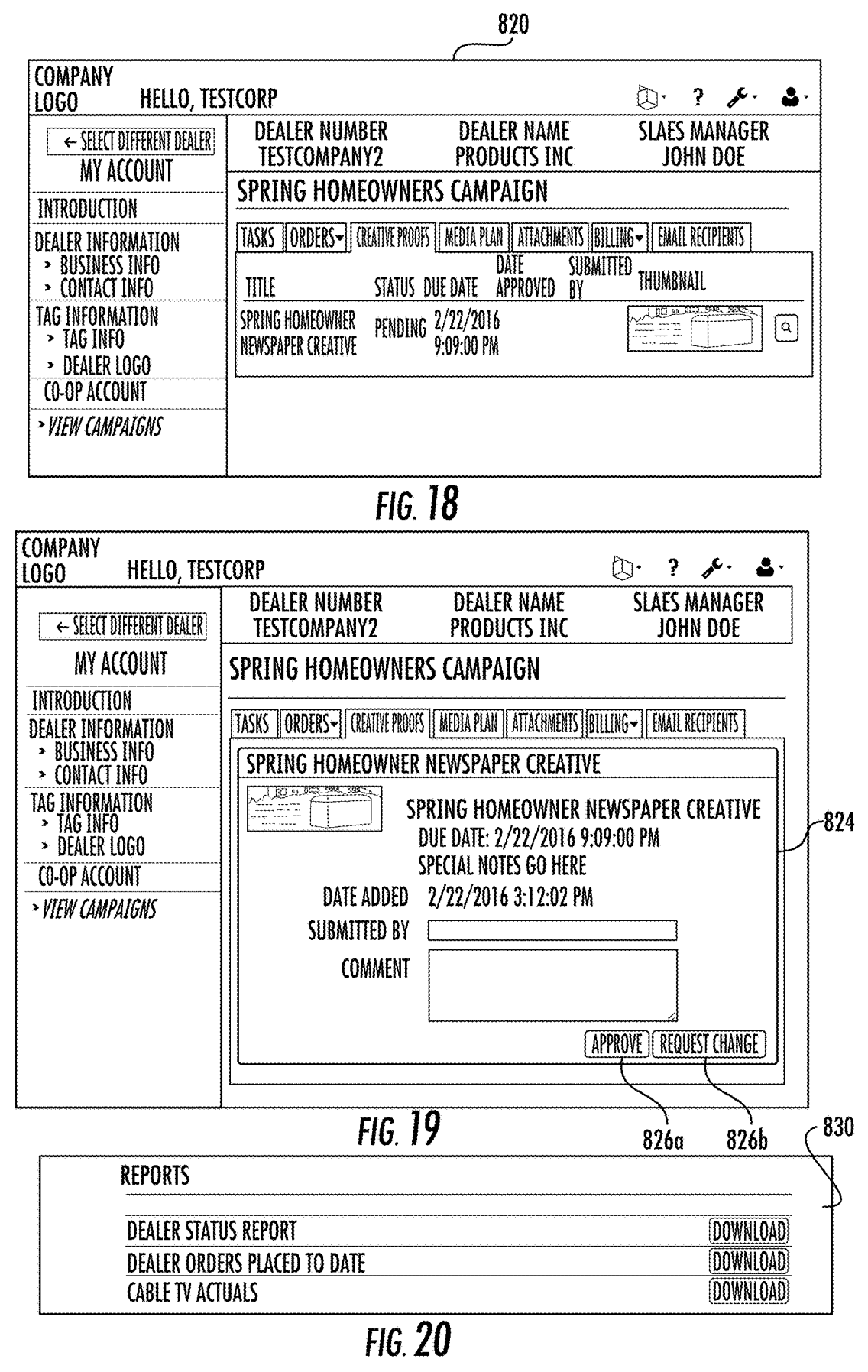

FIG. 17 details a "My Account" screen 820, which shows the current statuses (as well as past history) of all orders/requests submitted to date, including the status of each order. For instance, this section may show whether a media plan or proof needs to be approved. The entity such as the nano entity 104 or a dealer can view a media plan an advertising agency put together for them and either approve it or request changes to it. A similar screen is used for reviewing/approving customized creative proofs. FIG. 18 further displays how a client entity may see the details of an individual advertising campaign and the respective status, such as pending, approved, or awaiting changes. In order to review and/or approve the digital assets such as the proofs of a print campaign, a user may click on a magnifying glass button 822 on the screen 820, which may lead the user to the proof approval screen 824 with more detail on the particular campaign, as shown in FIG. 19. The user may then click on the picture to get a larger, more detailed view of the proof, and click on a proof approval button 826a, or they may also request a change to the proof via a request change button 826b. It should be known that any other option may be available to the user as requested or required by the client. FIG. 20 details a campaign report screen 830. From the campaign report screen, any entity with access may see real-time reports on campaign statuses, orders placed to date, and actual advertising conducted to that point. Which entities may see the individual reports, as well as the details within the reports, may be set in the rules, which may be set by the systems entity 101, the macro entity 102, or if a regional campaign, a micro entity 103.

Figure 21:
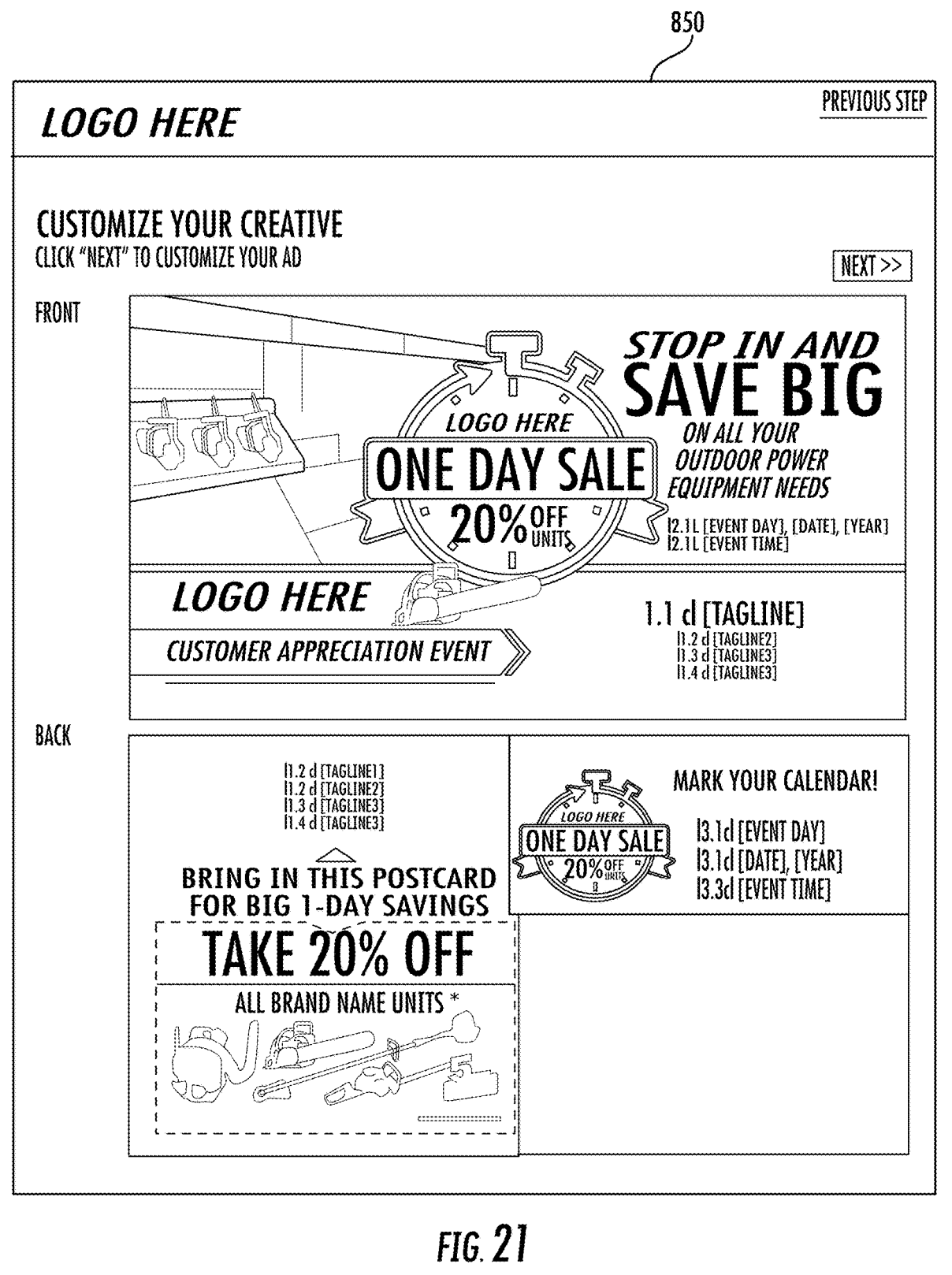

In FIGS. 21-24, in another exemplary aspect where, a lawn care equipment dealer, e.g. Lawn Company, may set up an individual advertising campaign, such as a postcard mailing campaign. FIG. 21 details a postcard creation screen 850. A dealer or nano entity 104 may choose from existing digital assets provided by the dealer, or to keep consistent with the macro entity, provided by the macro entity. The dealer may also customize the postcard with locations for the dealer's address, name, and time of a potential campaign event. Once the digital assets and layout are chosen, the dealer may then go to a proof approval screen 824. In this embodiment, the proof approval screen allows the dealer to input the details of the dealer, such as address, dates of the event, any taglines, and a dealer logo. The dealer may also have the chance to review in detail the proofs of the postcard and submit them for printing and sending out.

FIG. 23 details a dealer administration screen 860. On this screen, a micro entity 103, or a macro entity 102, may add dealers or other nano entities 104 to an advertising campaign. As shown, the micro entity may login to an order site, add or remove dealers from the campaign, see the remaining budget for each dealer, view account information regarding the dealers, or any other information that the client requests or requires.

When determining where the entity would like to mail the postcards, there are a number of data to choose from, as shown in detail in FIG. 24. The entity may choose, in another version of mailing screen 702, by ZIP code a distance from the dealer, average home value of the ZIP code, average income, and population of the ZIP code or other demographic data. It should be known that any demographic or other data may be added to this screen as the client requests or requires.

Figure 26:
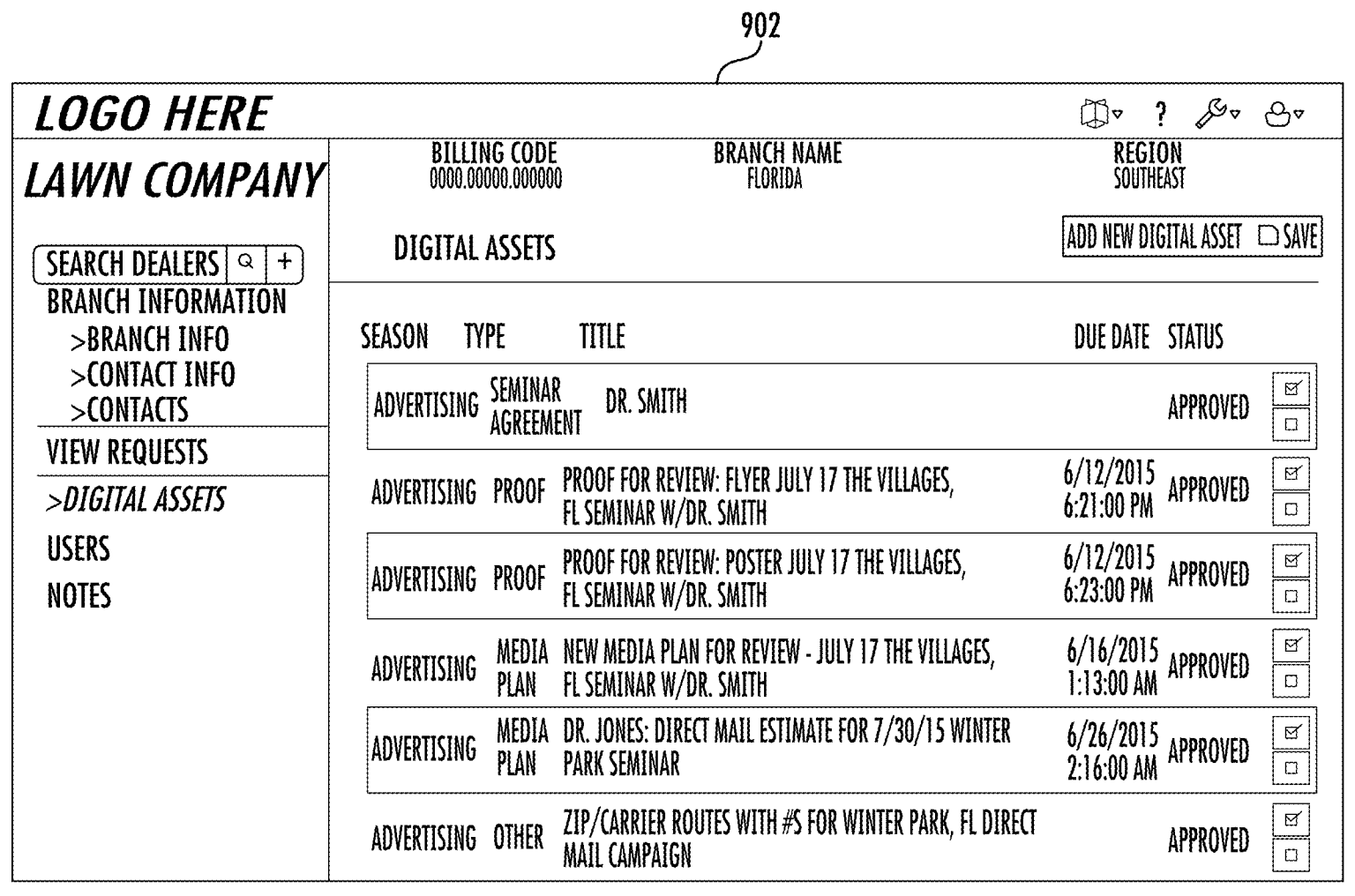
Figure 28:
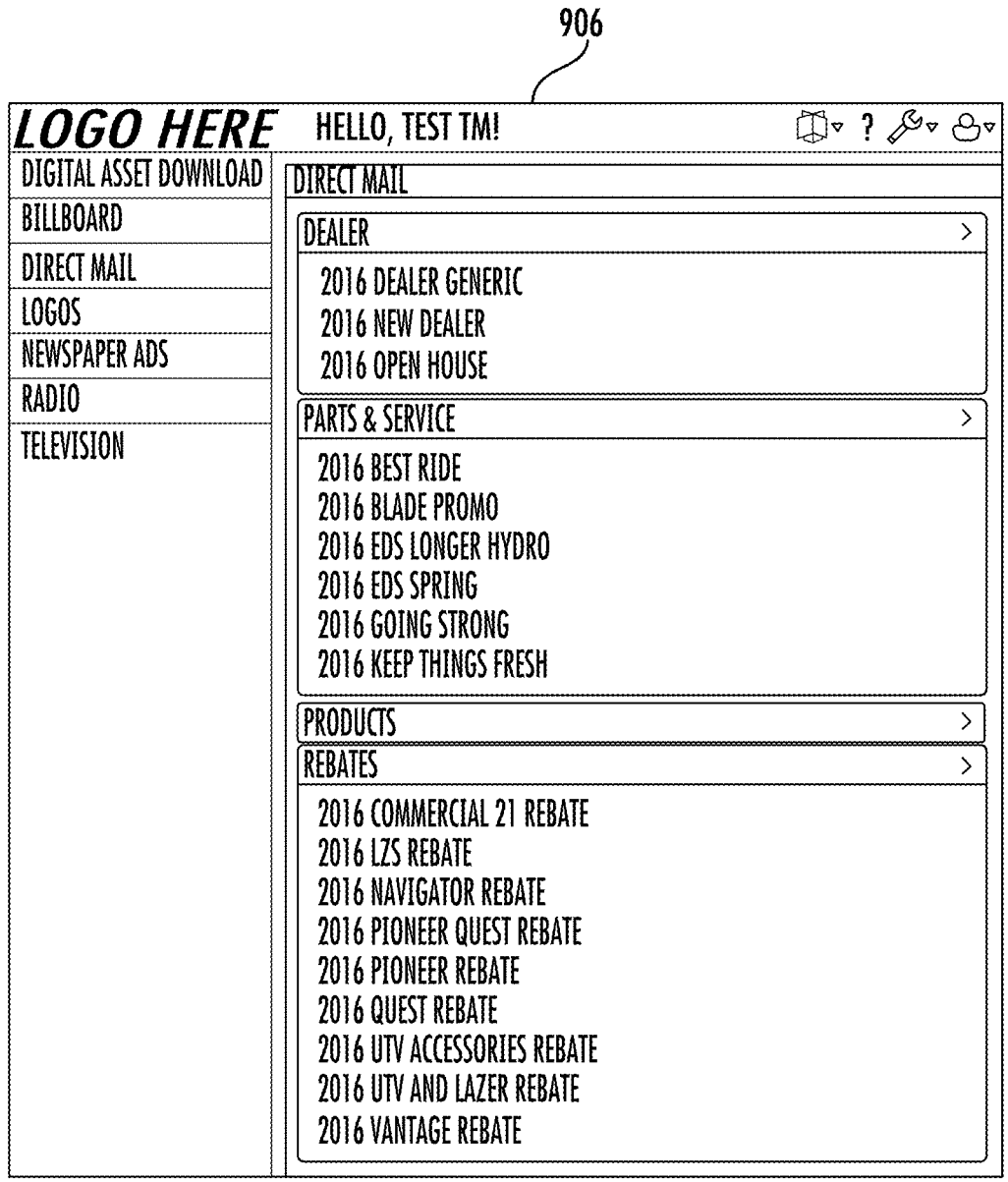

FIGS. 25-28 detail another exemplary aspect of the present disclosure. In this aspect, a systems entity 101, such as an advertising agency, may oversee a number of data concerning all of the agency's clients. FIG. 25 shows an agency client review screen 900. On this screen 900, the agency may look at all of the projects they are involved in with any given client. They can also see the status of all projects, see who is responsible for the next tasks, and see any due dates associated with the tasks. The agency may also see and review any campaign plans or proofs with a single click, and all data are updated automatically and in real-time, without an administrator necessary to update the information. FIG. 26 displays a digital assets section 902, which lays out all of the proofs necessary for approval in one location. FIG. 27 displays the agency may keep track of and store information about which individuals on the client side of things are authorized to access each branch account in the agency's system. FIG. 28 shows an example of Digital Asset Download, where a client may download any asset digitally by selecting which media option they want in the left navigation and then clicking on the piece. The user can then save it to their computer.

Figure 30:
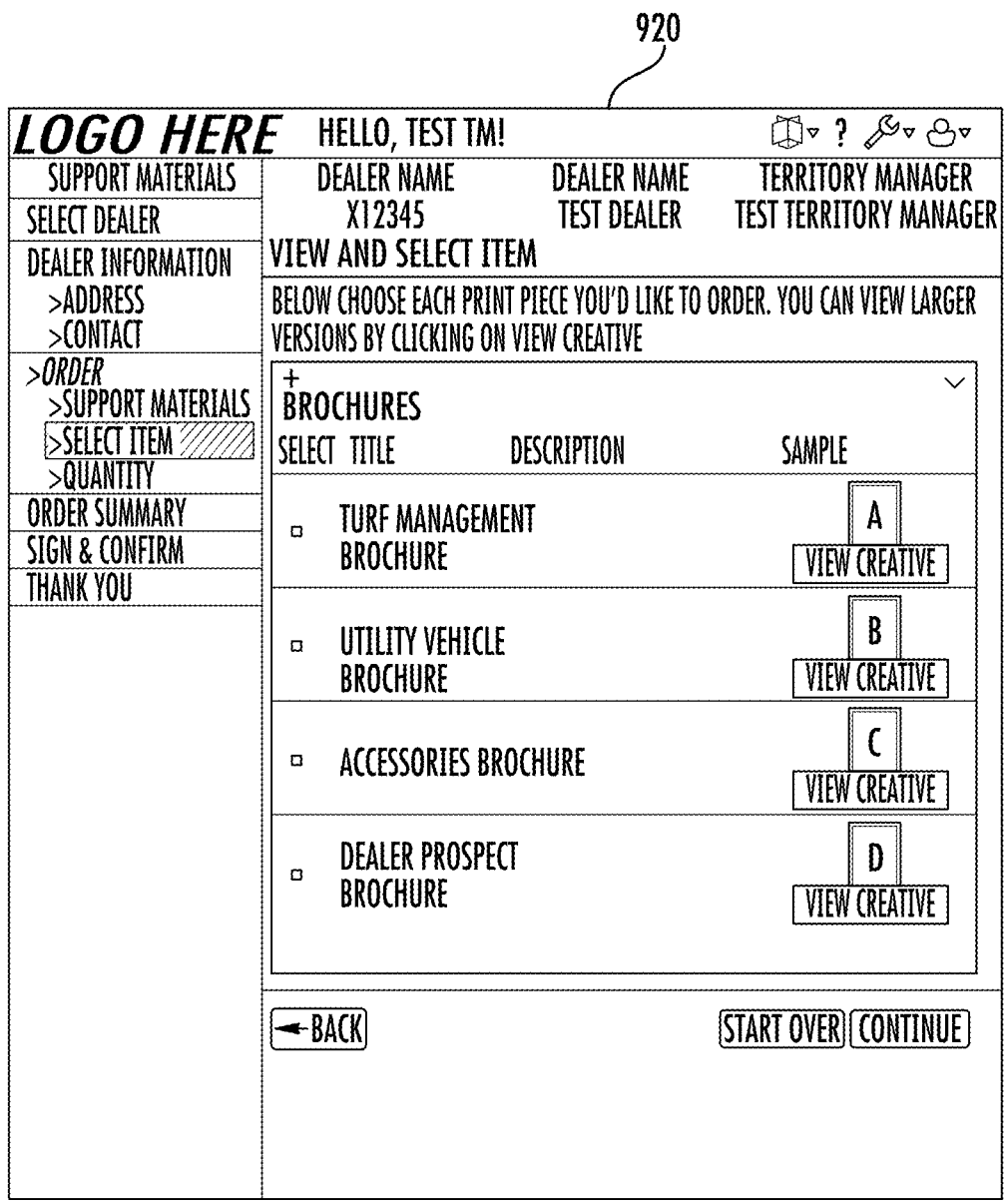
FIG. 30 is an exemplary Collateral Material ordering screen according to an aspect of the present disclosure, which allows a user to order macro entity (corporate) approved print materials to be shipped to the micro or nano entity.

Other exemplary aspects of the present disclosure that may be used in conjunction with one or more of the other aspects described herein will be detailed further below. FIG. 29 details another exemplary aspect of the present disclosure that relates to the Co-Op reimbursement screen 910. This screen shows how a user can upload invoices and ad proofs that they placed on their own to be approved for Co-op reimbursement. FIG. 30 details Collateral Material Ordering screen 920 if a user would like to order corporate print materials to be shipped to their business they can do that through the system on this screen. These materials may be corporate-directed advertising materials that are not micro or nano specific materials.

FIGS. 31-36 display a back-end screen build system 930. The back-end build system 930 according to an aspect of the present disclosure provides a way for entities, which are typically corporate macro entities but could be other entities as well, to create a new client advertising site easily in a step-by-step process. Significantly, this is achieved without any programming personnel required to implement the advertising site. No programming is necessary for any entity to use the system due to the fact that all fields for each of the various functions and alternatives shown above are present. The systems of the present disclosure display only certain selected fields to the user based upon the setup selections made and the level of user access provided to the user of the site. The unique URL of the particular entity is used as the key to direct the remote server system(s) of the present disclosure to display the predetermined fields of information. User login information is thereafter used to further refine and limit the display to information from all or a subset of the information contained within a given field pre-selected by the administrative user during initial setup or adjustment of the site later. In this manner, the overall systems of the present disclosure may be used across virtually all or all goods and services from actual tangible items to advertising for services or other offerings like presentations on a given topic. The advertising site is produced using the back-end display creation system(s) of the present disclosure to select and implement the various functionalities described above that may be used by entities at various levels while also providing a high level of control to the client generating the site to regulate marketing materials, messaging and budget use. Providing the tool for the agency's clients across all varieties of goods and service provider clients to create an advertising site without programming personnel is a significant point of differentiation from any other model existing today. As clients request changes, a system entity 101 user can make changes within minutes to the site using the back-end system 930, which passes the changes on to that particular client, more than one particular client or all clients using the systems of the present disclosure. The need to create custom sites, interfaces and databases is reduced and/or eliminated through use of the systems of the present disclosure.

Figure 31:
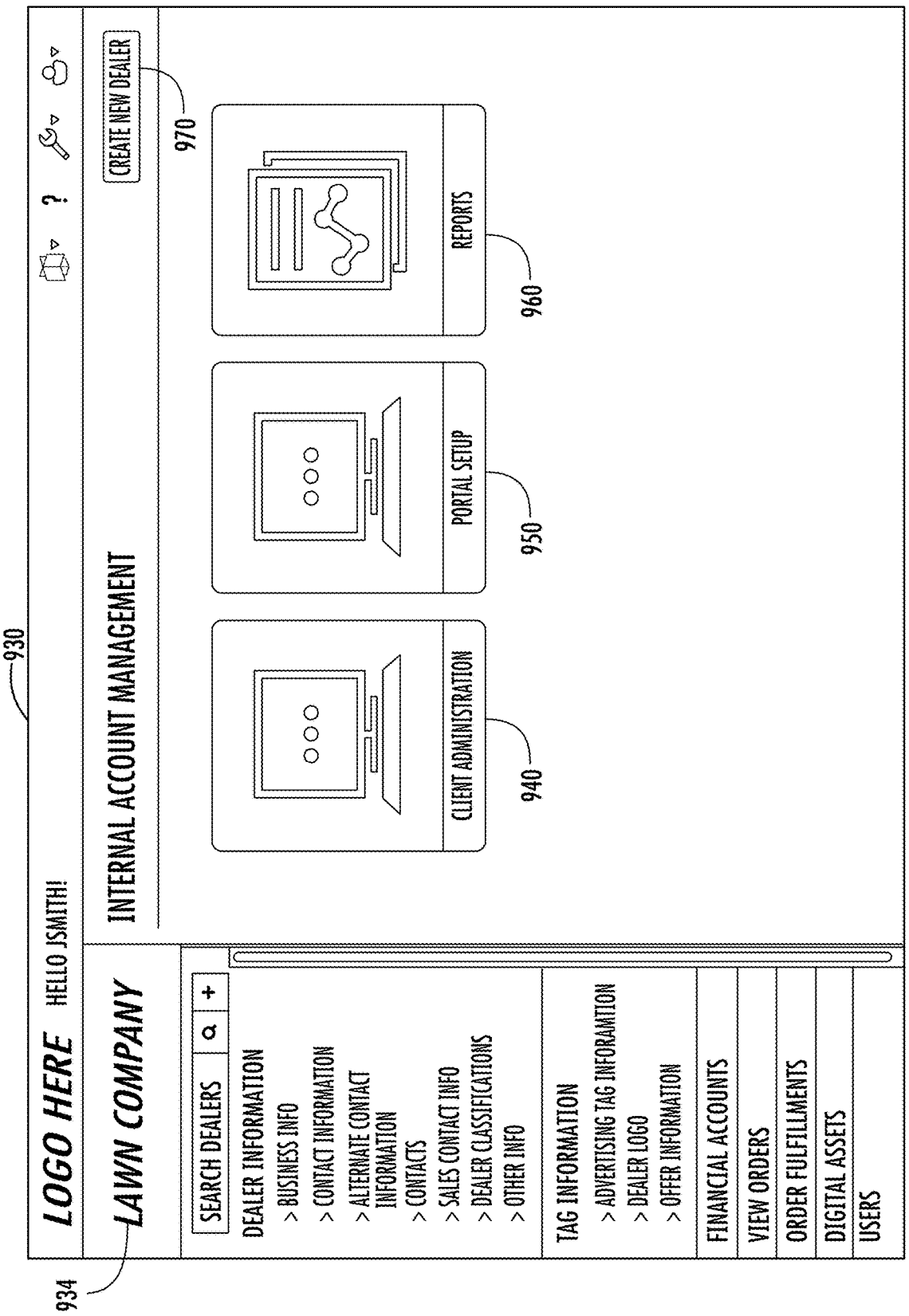
FIG. 31 is an exemplary back-end set up display screen according to an aspect of the present disclosure, which is initially displayed to the user creating the advertising site. This screen allows a user to navigate and setup the client and thereafter the user's site itself.

First, the user would navigate to the client setup screen such that the client setup screen is displayed to the user in a manner that may be as shown in FIG. 31. The client setup display screen of FIG. 31, has three main functions, a client administration link 940 that causes the display of the client administration information, a portal setup link 950, and a reports link 960. The site further typically has a link that, when activated, creates a new dealer (macro entity) in the system as well as typically a logo 934 for the advertising agency or the client that is setting up a portal or another portal using the systems of the present disclosure.

Figure 32:
FIG. 32 is an exemplary setup screen that displays all of the information typically used to set up a client in the system prior to generating a marketing site and is displayed upon activating of the "create new dealer" or other similar link on the back-end set up display screen of FIG. 31.

FIG. 32 is a screen that is displayed after a user selects the client administration link 940. This screen allows the user setting up the portal to upload a logo to be used across all pages on the site. The various elements that are requested at various screens are shown on the left user interface navigation bar and displays all of the different elements to set-up from business information, user hierarchy, media types, etc. Activation of the continue link 1002 takes the user to the next input screen. In this case, that would be the hierarchy page.

FIGS. 33-36 show the portal set-up screen 932 that allows a user to create the site that the client is requesting without any programming. Creating the login page, the advertising periods, uploading media tactics and rates, media run dates, etc. Portal set-up allows the user to create and edit each page of the site. Page headlines, left navigation titles, header copy, footer copy. All of it is completely customizable and unique for each client if needed. As shown in FIG. 33, the custom URL is entered and uploaded as discussed above. Activation of the continue link 1004 would take the user to the next set up page to set the color scheme for the site and thereafter though the information in the left navigation bar. As shown in FIG. 34, the user eventually sets workflow templates and sets the fields 1006 that are to be used for the site generally. Typically this can be done by activating a link 1008 that toggles the field between on and off. As discussed above, a user's login credentials may also further limit the fields seen by the end user(s) of the site after it is created.

As detailed in FIG. 35, the system of the present disclosure allows the user to upload all of the creative by promotion or season for each or selected media such as radio, print advertising, direct mail, internet pay per clicks etc. FIG. 36 shown an aspect of the present disclosure that allows for the option to set-up email communication for the agency's client. For example—if an advertising plan has been ordered through the site—a predetermined communication will go out to the user and whoever needs to receive it from the corporation or client—a predetermined communication subset or set of people within the portal for that particular entity. If a media plan or creative proof is approved—communication will go out to the user thereafter. This system allows the agency to set-up any type of communication and to whom it will go to to ensure proper communication and transparency.

What is claimed is:

1. A method to implement and simultaneously manage at least: marketing content, marketing budget, and marketing delivery consistent with a brand marketing strategy of a macro entity brand owner across multiple sub-entities comprising the steps of:

providing a remote computer server system accessible via a wireless or wired network and containing a database of marketing fields;

setting up a marketing management portal for the macro entity brand owner for the macro entity brand owner's brand using a marketing portal setup computer system that is displayed on a set up user's computer system, wherein the marketing management portal is automatically generated without further programming when the set up user accesses a marketing portal data input screen using the setup user's computer system to access the remote computer server system containing the setup computer network to access a marketing portal setup server system that is remote from the setup user's computer system and wherein the setup user provides setup input via one or more setup screens wherein the setup input includes at least a unique URL for the marketing management portal and one or more fields that are to be selected by the setup user and used in connection with the marketing management portal for the macro entity brand owner for the macro entity brand owner's brand that thereby define the set of marketing portal fields;

providing a plurality of marketing management portal users with user credentials for access to the marketing management portal wherein each of the plurality of marketing management portal user credentials determines which field or fields within the set of marketing fields may be accessed by the marketing management portal user and wherein the field or fields displayed to a marketing management portal user that is affiliated with the macro entity brand owner is different from the field or fields displayed to a sub-entity user and wherein the plurality of marketing management portal users are provided access the marketing management portal and comprise a plurality of different sub-entity users and the sub-entity users are users associated with a plurality of micro entities, a plurality of nano entities or both a plurality of micro entities and a plurality of nano entities;

automatically and dynamically determining a plurality of preapproved advertising campaign options to be presented to the marketing management portal users based upon information received into an artificial intelligence compiler;

wherein the plurality of preapproved advertising campaign options are produced and/or preapproved by the macro entity brand owner prior to being selected for inclusion in a selected advertising campaign by the marketing management portal user with user credentials;

an individual marketing management portal user from one of the plurality of micro entities or the plurality of nano entities selecting at least one of the preapproved advertising campaign options using the marketing management portal; wherein the delivery method for the selected preapproved advertising campaign is chosen from the group consisting of: pay per click advertising, print publication advertising, direct mail advertising, social media advertising, radio advertising, online video advertising, and television advertising; and executing the selected and preapproved advertising campaign without further input from the marketing management portal user that selects the preapproved advertising campaign.

2. The method of claim 1, wherein a user from a micro entity, a nano entity or both a micro entity and a nano entity provide feedback information to the artificial intelligence compiler which automatically and dynamically updates the marketing management portal based on the feedback information received by the artificial intelligence compiler; and wherein the method further comprises the step of presenting the optimal mix of preapproved advertising campaign options to a marketing campaign purchasing user prior to the user selecting the at least one preapproved advertising campaign options using the marketing portal.

3. The method of claim 2, wherein the artificial intelligence compiler automatically and dynamically reallocates media offerings offered via the marketing management portal based on feedback success rates and adjusts the media offerings displayed to the marketing campaign purchasing user for potential purchase and use in marketing based on the feedback success rates and wherein the marketing campaign purchasing user is a user associated with the micro entity or the nano entity.

4. The method of claim 3, wherein the artificial intelligence compiler evolves metrics based on repetitive feedback data received from the micro entity or the nano entity regarding the effectiveness of the selected preapproved advertising campaign.

5. The method of claim 1, wherein the marketing management portal regulates and tracks advertising budgets and displays to a user associated with the plurality of micro entities, the plurality of nano entities or both the plurality of micro entities and a plurality of nano entities credentials that allow access by the plurality of micro entities, the plurality of nano entities or both the plurality of micro entities and a plurality of nano entities to budgetary information to view spend on one or more advertising campaigns initiated using the marketing management portal.

6. The method of claim 5, wherein the marketing management portal regulates and tracks advertising budgets and displays to a user with credentials that allow access to budgetary information to view spend on one or more advertising campaigns initiated using the marketing management portal in substantially real time.

7. The method of claim 1, wherein the marketing management portal is used to access the remote computer server system and the remote computer server system displays, via the marketing management portal, budgeted payments that are tracked and controlled via an allocation subsystem and wherein the macro entity is a brand owner, the micro entity is a dealer for the macro entity, and the nano entity is an individual store or company.

8. The method of claim 7, wherein the step of executing the selected and preapproved advertising campaign without further input from the user with credentials is performed by a systems entity that is an advertising agency engaged by the macro entity.

9. The method of claim 8 further comprising the step of using a request number and a validation number to regulate authorization and distribution of funds for a given executed, selected, and preapproved marketing campaign wherein funds tracking is achieved via the request number and wherein the request number includes at least one modulo check digit.

10. The method of claim 9, wherein the request number is saved in a database with a specific allocated authorized amount.

11. The method of claim 10 further comprising the step of paying funds to a vendor via a validation number.

12. The method of claim 11, wherein the validation number is generated by a cryptographic function utilizing the request number as one of its inputs.

13. The method of claim 12, wherein the validation number cryptographic function is a hash.

14. The method of claim 12, wherein the validation number cryptographic function is an encryption algorithm.

15. A method for a plurality of dealers and/or store owners to individually select and execute a brand-preapproved advertising campaign based upon at least budgeted money available and provided at least in part by a brand owner comprising the steps of:

providing a remote computer server system accessible via a wireless or wired network wherein the remote computer server system is provided by a systems entity;

initially setting up a marketing management portal website with a unique domain name wherein the marketing management portal website relates to a single brand and wherein the marketing management portal website is stored on the remote computer server system and accessible by a plurality of users via the wireless or wired network using the unique domain name and wherein the marketing management portal website displays a marketing management portal to the brand owner, the distributor or the store owner user that is customized based on the brand owner, the distributor or the store owner's user credentials and access permissions;

displaying defined fields to the brand owner, distributor, or store owner user based on credentials and access permissions when the marketing management portal website is accessed and the brand owner, distributor, or store owner user logs into the website using the brand owner, the distributor or the store owner's credentials and wherein a systems entity user selects and determines which of a plurality of standardized fields available for use across multiple different marketing management portal websites will be presented to the brand owner, distributor, or store owner user when the brand owner, distributor, or store owner user accesses the marketing management portal website and logs into the marketing management portal website to establish the defined fields prior to the initial access to the marketing management portal website by the user;

providing a pooled account of monetary funds where monetary funds are provided from the brand owner and at least one of the distributor and the store owner and the funds from the brand owner are allocated to one or more of a plurality of distributors and store owners;

displaying a plurality of preapproved advertising campaign options to a plurality of the macro, micro or nano entity users based upon the access permissions and at least one of (1) the amount of pooled monetary funds allocated to the brand owner, the distributor or the store owner; (2) the delivery method for the selected preapproved advertising campaign; (3) the geographic territory to be covered by the preapproved advertising campaign; (4) brand defined advertising rules; (5) the time of the preapproved advertising campaign; and (6) a date of the preapproved advertising campaign; and wherein the preapproved advertising campaign options are produced from one or more pieces of preapproved material available from the marketing management portal website and/or preapproved by the brand owner prior to being selected for inclusion in a selected advertising campaign by the marketing management portal user with user credentials;

displaying a plurality of preapproved advertising campaign options to various marketing management portal users with user credentials for the users with user credentials to select by accessing the marketing management portal and wherein the remote computer server system automatically and dynamically recalibrates the plurality of preapproved advertising campaign options displayed to the brand owner, the distributor or the store owner users with user credentials based upon information about cost effectiveness of one or more previously implemented advertising campaigns and an amount of funds allocated to the brand owner, the distributor or the store owner associated with the marketing management portal user that will be selecting one or more of the plurality of preapproved advertising campaign options;

the marketing management portal user selecting at least one of the preapproved advertising campaign options using the marketing management portal; wherein the delivery method for the selected preapproved advertising campaign is chosen from the group consisting of: pay per click advertising, print publication advertising, direct mail advertising, social media advertising, radio advertising, online video advertising, and television advertising; and executing the selected and preapproved advertising campaign without further input from the user with credentials.

16. The method of claim 15 further comprising the step of paying one or more media vendor from the pooled account of monetary funds by delivering a request number to a media vendor that will execute at least a portion of the selected and preapproved advertising campaign as a purchase order.

17. The method of claim 16 further comprising the step of using a validation number associated with the request number to release allocated funds to the media vendor from the pooled account of monetary funds.

18. The method of claim 17, wherein the each transaction is recorded as to the fund provider, the brand owner, the distributor or the store owner; geographic territory; and media vendor; wherein the request number includes at least one modulo check digit and the request number is saved in a database with a specific allocated authorized amount and wherein the validation number is generated by a cryptographic function utilizing the request number as one of its inputs and wherein the cryptographic function is chosen from the group consisting of: a hash and an encryption algorithm; and wherein the systems entity is a separate entity from the brand owner, each distributor and each store owner and is either an advertising agency or an internet hosting company or service.

19. A method for a plurality of dealer and/or local store users to individually select and execute a brand-preapproved advertising campaign based upon at least budgeted money available and provided at least in part by a brand owner comprising the steps of:

providing a remote computer server system accessible via a wireless or wired network wherein the remote computer server system is provided by a systems entity;

initially setting up a marketing management portal website with a unique domain name where the marketing management portal website is stored on the remote computer server system and accessible by a plurality of users via the wireless or wired network using the unique domain name and wherein the marketing management portal website displays a marketing management portal to a brand owner, distributor, or local store user that is customized based on the brand owner, distributor, or local store user's credentials and access permissions;

displaying defined fields to the brand owner, distributor, or local store user based on credentials and access permissions when the marketing management portal website is accessed and the brand owner, distributor, or local store user logs into the website using the brand owner, distributor, or local store user's credentials and wherein a systems entity user selects and determines which of a plurality of standardized fields available for use across multiple different marketing management portal websites will be presented to the brand owner, distributor, or local store user when the unique domain name is accessed the brand owner, distributor, or local store user accesses the marketing management portal website and logs into the marketing management portal website to establish the defined fields prior to the initial access to the marketing management portal website by the user;

providing a pooled account of monetary funds where monetary funds are provided from a brand owner and at least one of a distributor and a local store and the funds from the brand owner are allocated to one or more of a plurality or distributors or local stores;

displaying a plurality of preapproved advertising campaign options to a plurality of the brand owner, distributor, or local store users based upon the access permissions, the amount of pooled monetary funds allocated to the brand owner, distributor, or store owner and wherein the preapproved advertising campaign options are produced from one or more pieces of preapproved material available from the marketing management portal website and/or preapproved by the brand owner prior to being selected for inclusion in a selected advertising campaign by the marketing management portal user with user credentials and wherein the remote computer server system automatically and dynamically recalibrates the plurality of preapproved advertising campaign options displayed to the brand owner, the distributor or the store owner users with user credentials based upon an amount of funds allocated to the brand owner, the distributor or the store owner associated with the marketing management portal user that will be selecting one or more of the plurality of preapproved advertising campaign options; and selecting at least one of the preapproved advertising campaign options using the marketing management portal; wherein the delivery method for the selected preapproved advertising campaign is chosen from the group consisting of: pay per click advertising, print publication advertising, direct mail advertising, social media advertising, radio advertising, online video advertising, and television advertising;

executing the selected and preapproved advertising campaign without further input from the user with credentials; and paying one or more media vendor from the pooled account of monetary funds by delivering a request number to a media vendor that has executed at least a portion of the selected and preapproved advertising campaign wherein the request number is delivered as a purchase order and using a validation number associated with the request number to release allocated funds to the media vendor from the pooled account of monetary funds when the median vendor's work on the selected and preapproved advertising campaign is complete.

20. The method of claim 19, wherein the step of selecting the at least one of the preapproved advertising campaign options is done by the store owner user;

wherein one or more pieces of preapproved material available from the marketing management portal website are housed in an advertising campaign data warehouse;

wherein the one or more pieces of preapproved material include artwork and media uploaded by the brand owner;

wherein the advertising campaign data warehouse and the marketing management portal are particular to a particular brand's advertising campaign; and wherein the step of displaying a plurality of preapproved advertising campaign options to a plurality of the brand owner, distributor, or local store users is based upon the access permissions and the amount of pooled monetary funds allocated to the brand owner, distributor, or store owner and (1) the preapproved advertising campaign options available using the marketing management portal; (2) the geographic territory to be covered by the preapproved advertising campaign; (3) brand defined advertising rules; (4) time of the preapproved advertising campaign; and (5) date of the preapproved advertising campaign; and wherein the each transaction is recorded as to the fund provider, the brand owner, the distributor, or the local store user; geographic territory; and media vendor; wherein the request number includes at least one modulo check digit and the request number is saved in a database with a specific allocated authorized amount and wherein the validation number is generated by a cryptographic function utilizing the request number as one of its inputs and wherein the cryptographic function is chosen from the group consisting of: a hash and an encryption algorithm; and wherein the systems entity is a separate entity from the brand owner, the distributors and the local stores and the systems entity is either an advertising agency or an internet hosting company or service.

* * * * *